(12) United States Patent
Karczewicz et al.

(10) Patent No.: US 8,891,615 B2
(45) Date of Patent: Nov. 18, 2014

(54) QUANTIZATION BASED ON RATE-DISTORTION MODELING FOR CABAC CODERS

(75) Inventors: Marta Karczewicz, San Diego, CA (US); Yan Ye, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1509 days.

(21) Appl. No.: 12/340,205

(22) Filed: Dec. 19, 2008

(65) Prior Publication Data

US 2009/0175332 A1    Jul. 9, 2009

Related U.S. Application Data

(60) Provisional application No. 61/019,830, filed on Jan. 8, 2008, provisional application No. 61/030,454, filed on Feb. 21, 2008.

(51) Int. Cl.
- *H04N 7/26* (2006.01)
- *H04N 19/132* (2014.01)
- *H04N 19/147* (2014.01)
- *H04N 19/124* (2014.01)
- *H04N 19/19* (2014.01)
- *H04N 19/176* (2014.01)

(52) U.S. Cl.
CPC ... *H04N 19/00127* (2013.01); *H04N 19/00175* (2013.01); *H04N 19/0009* (2013.01); *H04N 19/00351* (2013.01); *H04N 19/00278* (2013.01)
USPC .................................................. 375/240.03

(58) Field of Classification Search
CPC .................. H04N 19/00278; H04N 19/00351; H04N 19/00175
USPC ........................................ 375/240.01, 240.03

IPC .......................................................... H04N 7/26
See application file for complete search history.

(56) References Cited

U.S. PATENT DOCUMENTS

| | | | |
|---|---|---|---|
| 5,734,755 A | * | 3/1998 | Ramchandran et al. ...... 382/250 |
| 2006/0013493 A1 | * | 1/2006 | Yang et al. .................... 382/232 |

(Continued)

FOREIGN PATENT DOCUMENTS

| CN | 101095359 A | 12/2007 |
|---|---|---|
| EP | 1619901 A2 | 1/2006 |

(Continued)

OTHER PUBLICATIONS

"Context-based Adaptive Binary Arithmetic Coding in the H.264/AVC Video Compression Standard," by Detlev Marpe, Heiko Schwarz and Thomas Wiegand, published in IEEE Translations on Circuits and Systems for Video Technology, vol. 13, No. 7, Jul. 2003.

(Continued)

*Primary Examiner* — Jay Patel
*Assistant Examiner* — Yulin Sun
(74) *Attorney, Agent, or Firm* — Brent A. Boyd

(57) ABSTRACT

This disclosure describes techniques for quantizing coefficients of a video block for a video coding process that supports context-based adaptive binary arithmetic coding (CABAC). A method may comprise generating a plurality of sets of quantized coefficients for the video block, wherein each of the sets of quantized coefficients is defined based on an assumption that a particular one of the coefficients of the video block corresponds to a last non-zero coefficient of the video block, estimating a plurality of costs associated with coding the video block via the CABAC, wherein the estimated costs are based respectively on different ones of the sets of quantized coefficients, and selecting a given one of the sets of quantized coefficients associated with a lowest cost.

34 Claims, 10 Drawing Sheets

(56) References Cited

U.S. PATENT DOCUMENTS

| | | | |
|---|---|---|---|
| 2006/0098733 | A1 | 5/2006 | Matsumura et al. |
| 2007/0177664 | A1 | 8/2007 | Lee |
| 2007/0223580 | A1 | 9/2007 | Ye et al. |
| 2008/0037656 | A1 | 2/2008 | Hannuksela |
| 2008/0279466 | A1* | 11/2008 | Yang ............... 382/246 |

FOREIGN PATENT DOCUMENTS

| | | |
|---|---|---|
| JP | 3216075 A | 9/1991 |
| JP | 2005260576 A | 9/2005 |
| JP | 2005348310 A | 12/2005 |
| JP | 2006121538 A | 5/2006 |
| JP | 2006157881 A | 6/2006 |
| KR | 20060110718 A | 10/2006 |
| RU | 2006113092 A | 11/2007 |
| TW | 455821 B | 9/2001 |
| TW | 200307464 | 12/2003 |
| WO | WO9634495 | 10/1996 |
| WO | WO2006005182 | 1/2006 |
| WO | WO2007038248 | 4/2007 |
| WO | WO2007079964 A1 | 7/2007 |
| WO | WO2008136828 A1 | 11/2008 |
| WO | 2009089370 A1 | 7/2009 |

OTHER PUBLICATIONS

En-hui Yang, Xiang Yu, "Rate Distortion Optimization of H.264 with Main Profile Compatibility," IEEE International Symposium on Information Theory, Jul. 2006 pp. 282-286.

Karczewicz et al., "Two Pass Rate Distortion Based Quantization", U.S. Appl. No. 12/339,884, filed Dec. 19, 2008.

Dirk Farin et al: "Rate-Distortion Optimal Adaptive Quantization and Coefficient Thresholding for MPEG Coding" 23rd Symposium on Information Theory in the Benelux, May 2002, pp. 131-138, XP002528197 Louvain-la-Neuve, Belgium the whole document.

International Search Report/Written Opinion—PCT/US09/030465—International Search Authority EPO—Jun. 3, 2009.

Karczewicz, et al: "Rate distortion optimized quantization," 34th VCEG Meeting Jan. 12-13, 2008, Antalya, Turkey. Video Coding Experts Group of ITU-T SG.16, No. VCEG-AH21, Jan. 9, 2008.

Ramchandran, et al: "Rate distortion optimal fast thresholding with complete JPEG/MPEG decoder compatibility," IEEE Transactions on Image Processing, IEEE Service Center, Piscataway, NJ, US, vol. 3, No. 5. Sep. 1, 1994, pp. 700-704.

Wang, et al: "Rate distortion optimized quantization for H.264/AVC based on dynamic programming," Visual Communications and Image Processing, Beijing, China, Jul. 12, 2005.

Karczewicz M et, al: "Rate distortion optimized quantization" 27. JVT Meeting; Jun. 4, 2008-Oct. 4, 2008; Geneva, ; (Joint Video Team of ISO/IEC JTC1/SC29/WG11 and ITU-T SG.16 ),, Apr. 19, 2008, XP030007369 the whole document.

Yu-Kuang Tu et al, Rate-Distortion Modeling for Efficient H.264/AVC Encoding, IEEE Transactions on Circuits and Systems for Video Technology, vol. 17, No. 5, May 2007, pp. 530-543.

Moon Y.H., et al. "An Imporved Early Detection Algorithm for all-Zero Blocks in H.264 Video Encoding", IEEE Transactions on Circuits and Systems for Video Technology, 2005, vol. 15 (8), pp. 1053-1057.

Taiwan Search Report—TW098100525—TIPO—Feb. 6, 2014.

* cited by examiner

QUANTIZATION BASED ON RATE-DISTORTION MODELING FOR CABAC CODERS

This application claims the benefit of U.S. Provisional Application No. 61/019,830 filed on Jan. 8, 2008 and U.S. Provisional Application No. 61/030,454 filed on Feb. 21, 2008, the entire contents both of which are incorporated herein by reference.

TECHNICAL FIELD

This disclosure relates to digital video coding and, more particularly, quantization techniques for video coding processes that support context-based adaptive binary arithmetic coding (CABAC).

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, video gaming devices, video game consoles, cellular or satellite radio telephones, and the like. Digital video devices implement video compression techniques, such as MPEG-2, MPEG-4, or ITU-T H.264/MPEG-4, Part 10, Advanced Video Coding (AVC), to transmit and receive digital video information more efficiently. Video compression techniques perform spatial prediction and temporal prediction to reduce or remove redundancy inherent in video sequences.

Intra-coding relies on spatial prediction to reduce or remove spatial redundancy between video blocks within a given coded unit, which may comprise a video frame, a slice of a video frame, a group of pictures, or another defined unit of video blocks. In contrast, inter-coding relies on temporal prediction to reduce or remove temporal redundancy between video blocks of successive coded units of a video sequence. For intra-coding, a video encoder performs spatial prediction to compress data based on other data within the same coded unit. For inter-coding, the video encoder performs motion estimation and motion compensation to track the movement of corresponding video blocks of two or more adjacent coded units.

A coded video block may be represented by prediction information that can be used to create or identify a predictive block, and a residual block of data indicative of differences between the block being coded and the predictive block. In the case of inter-coding, one or more motion vectors are used to identify the predictive block of data, while in the case of intra-coding, the prediction mode can be used to generate the predictive block. Both intra-coding and inter-coding may define several different prediction modes, which may define different block sizes and/or prediction techniques used in the coding. Additional types of syntax elements may also be included as part of encoded video data in order to control or define the coding techniques or parameters used in the coding process.

After block-based prediction coding, the video encoder may apply transform, quantization and entropy coding processes to further reduce the bit rate associated with communication of a residual block. Transform techniques may comprise discrete cosine transforms or conceptually similar processes. Alternatively, wavelet transforms, integer transforms, or other types of transforms may be used. In a discrete cosine transform (DCT) process, as an example, the transform process converts a set of pixel values into transform coefficients, which may represent the energy of the pixel values in the frequency domain. Quantization is applied to the transform coefficients, and generally involves a process that limits the number of bits associated with any given transform coefficient. Entropy coding comprises one or more processes that collectively compress a sequence of quantized transform coefficients.

Context-based adaptive binary arithmetic coding (CABAC) is one type of entropy coding technique that is currently supported in some coding standards, such as the ITU-T H.264/MPEG4, AVC standard. CABAC may involve several stages, including binarization, context model selection, and binary arithmetic coding. In binarization, any non-binary symbols are mapped to a binary sequence (sometimes called a bin string). In context modeling, a model probability distribution is assigned to the elements (e.g., symbols) that are being coded. Then, in the subsequent binary arithmetic coding stage, the assigned probability distribution is used to perform the coding in order to generate a sequence of bits that form a coded representation of the elements being coded according to the assigned model probability distribution.

The CABAC process can losslessly compress elements that define the video stream by knowing the probabilities of elements in a given context. CABAC typically compresses data more efficiently than other entropy coding techniques, such as content adaptive variable length coding (CAVLC) techniques, but may require considerably more complicated processing on the decoder side. CABAC in the ITU H.264/AVC settings are more fully described in the following publication: "Context-based Adaptive Binary Arithmetic Coding in the H.264/AVC Video Compression Standard," by Detlev Marpe, Heiko Schwarz and Thomas Wiegand, published in IEEE Translations on Circuits and Systems for Video Technology, Volume 13, Number 7, July 2003.

SUMMARY

In general, this disclosure describes quantization techniques that may be used to quantize coefficients of a video block for a video coding process that supports context-based adaptive binary arithmetic coding (CABAC). The described techniques can account for CABAC during the quantization process by performing and/or estimating some of the CABAC steps during the quantization process. The techniques may be used to achieve a desirable balance between coding rate and distortion in the quantization step of video coding. According to the techniques, a plurality of costs associated with coding the video block via CABAC can be estimated for different sets of quantized coefficients. The sets of quantized coefficients associated with a lowest cost can then be selected to define the quantized coefficients.

In one example, this disclosure provides a method of quantizing coefficients of a video block for a video coding process that supports CABAC. The method comprises generating a plurality of sets of quantized coefficients for the video block, wherein each of the sets of quantized coefficients is defined based on an assumption that a particular one of the coefficients of the video block corresponds to a last non-zero coefficient of the video block, estimating a plurality of costs associated with coding the video block via the CABAC, wherein the estimated costs are based respectively on different ones of the sets of quantized coefficients, and selecting a given one of the sets of quantized coefficients associated with a lowest one of the costs.

In another example, this disclosure provides an apparatus configured to quantize coefficients of a video block for a video coding process that supports CABAC. The apparatus comprises a quantization unit that generates a plurality of sets of quantized coefficients for the video block, wherein each of the sets of quantized coefficients is defined based on an assumption that a particular one of the coefficients of the video block corresponds to a last non-zero coefficient of the video block, estimates a plurality of costs associated with coding the video block via the CABAC, wherein the estimated costs are based respectively on different ones of the sets of quantized coefficients, and selects a given one of the sets of quantized coefficients associated with a lowest cost.

In another example, this disclosure provides a device that quantizes coefficients of a video block for a video coding process that supports CABAC, the device comprising means for generating a plurality of sets of quantized coefficients for the video block, wherein each of the sets of quantized coefficients is defined based on an assumption that a particular one of the coefficients of the video block corresponds to a last non-zero coefficient of the video block, means for estimating a plurality of costs associated with coding the video block via the CABAC, wherein the estimated costs are based respectively on different ones of the sets of quantized coefficients, and means for selecting a given one of the sets of quantized coefficients associated with a lowest cost.

In another example, this disclosure provides a device configured to quantize coefficients of a video block for a video coding process that supports context-based adaptive binary arithmetic coding (CABAC), the device comprising a coding unit and a transmitter, the coding unit including a quantization unit and a CABAC unit. The quantization unit calculates a plurality of sets of quantized coefficients for the video block, wherein each of the sets of quantized coefficients are defined based on assumptions that a particular one of the coefficients of the video block corresponds to a last non-zero coefficient of the video block, estimates a plurality of costs associated with coding the video block via the CABAC, wherein the estimated costs are based respectively on different ones of the sets of quantized coefficients, selects a given one of the sets of quantized coefficients associated with a lowest cost, and outputs the given one of the sets of quantized coefficients. The CABAC unit receives the given one of the sets of quantized coefficients, performs the CABAC on the given one of the sets of quantized coefficients to entropy code the given one of the sets of quantized coefficients into a bitstream, and outputs the bitstream, and the transmitter transmits the bitstream.

The techniques described in this disclosure may be implemented in hardware, software, firmware, or any combination thereof. If implemented in software, the software may be executed in one or more processors, such as a microprocessor, application specific integrated circuit (ASIC), field programmable gate array (FPGA), or digital signal processor (DSP). The software that executes the techniques may be initially stored in a computer-readable medium and loaded and executed in the processor.

Accordingly, this disclosure also contemplates a computer-readable medium comprising instructions that upon execution cause a device to quantize coefficients of a video block in a video coding process that supports CABAC, wherein the instructions cause the device to generate a plurality of sets of quantized coefficients for the video block, wherein each of the sets of quantized coefficients is defined based on an assumption that a particular one of the coefficients of the video block corresponds to a last non-zero coefficient of the video block, estimate a plurality of costs associated with coding the video block via the CABAC, wherein the estimated costs are based respectively on different ones of the sets of quantized coefficients, and select a given one of the sets of quantized coefficients associated with a lowest cost.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
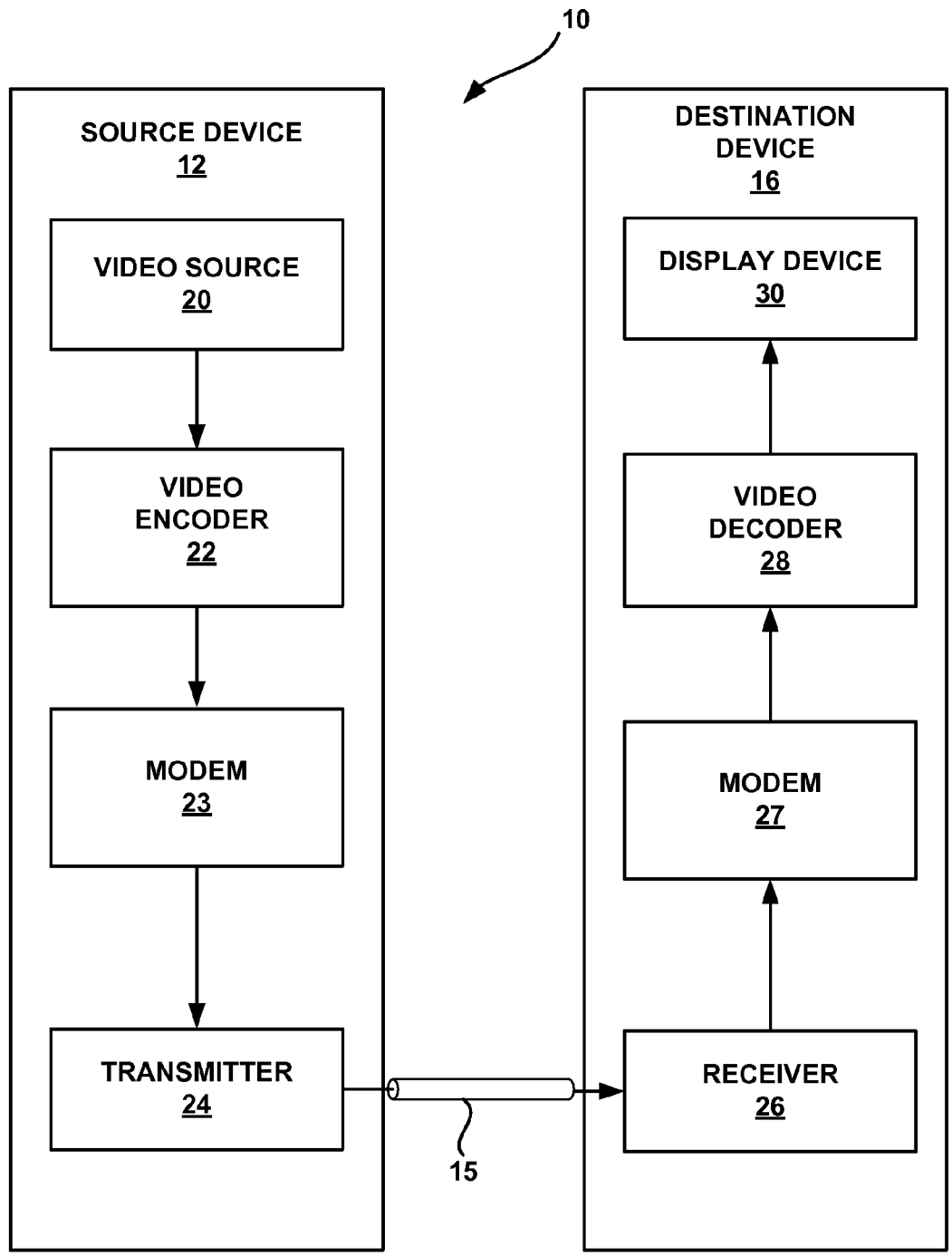
FIG. 1 is an exemplary block diagram illustrating a video encoding and decoding system.

FIG. 1 is a block diagram illustrating one exemplary video encoding and decoding system 10 that may implement techniques of this disclosure. As shown in FIG. 1, system 10 includes a source device 12 that transmits encoded video to a destination device 16 via a communication channel 15. Source device 12 and destination device 16 may comprise any of a wide range of devices. In some cases, source device 12 and destination device 16 comprise wireless communication devices, such as wireless handsets, so-called cellular or satellite radiotelephones, or any wireless devices that can communicate video information over a communication channel 15, in which case communication channel 15 is wireless. The techniques of this disclosure, however, which concern quantization, are not necessarily limited to wireless applications or settings.

In the example of FIG. 1, source device 12 may include a video source 20, video encoder 22 a modulator/demodulator (modem) 23 and a transmitter 24. Destination device 16 may include a receiver 26 a modem 27, a video decoder 28, and a display device 30. In accordance with this disclosure, video encoder 22 of source device 12 may be configured to apply quantization techniques that consider the effects of context adaptive binary arithmetic coding (CABAC). In this way, source device 12 may achieve desirable levels of quantization and thereby improve the encoding process.

The illustrated system 10 of FIG. 1 is merely exemplary. The quantization techniques of this disclosure may be performed by any encoding device that supports CABAC. Source device 12 is merely one example of such an encoding device. The quantization techniques of this disclosure may include quantizing coefficients of a video block for a video coding process that supports CABAC for entropy coding. In this case, video encoder 22 may generate a plurality of sets of quantized coefficients for the video block, wherein each of the sets of quantized coefficients is defined based on an assumption that a particular one of the coefficients of the video block corresponds to a last non-zero coefficient of the video block. The last non-zero coefficient may depend on the scanning order used, such as zig-zag scanning. Video encoder 22 may estimate a plurality of costs associated with coding the video block via CABAC, wherein the estimated costs are based respectively on different ones of the sets of quantized coefficients, and select a given one of the sets of quantized coefficients associated with a lowest cost. This approach may be referred to as a one-pass approach insofar as the estimated costs are generated for each of the different sets of quantized coefficients in a single pass that considers different coefficients as being the last non-zero coefficient of the video block.

Alternatively, the quantization techniques of this disclosure may follow a two-pass approach. In this case, the techniques may include estimating a last non-zero coefficient of the video block in a first pass, and then generating a set of quantized coefficients for the video block in a second pass based on an assumption that the estimated last non-zero coefficient is actually the last non-zero coefficient of the video block. This disclosure proposes both a combined one-pass approach, and a two-pass approach. In the combined one-pass approach, every possible coefficient may be considered as being the last non-zero coefficient and many possible sets of quantized coefficients may be generated for different coefficients being the last non-zero coefficient. In the two pass approach, however, estimation techniques are used to estimate the last non-zero coefficient, and sets of quantized coefficients may only be generated and considered for the single case where the estimated last non-zero coefficient is fixed as the last non-zero coefficient. The combined one-pass approach may be more computationally intensive than the one-pass approach, but may yield more accurate results in some cases. Various additional techniques may be used to reduce the computational complexity of the one-pass approach. The two-pass approach may significantly reduce complexity relative to the one-pass approach, and in many cases, the reductions in coding quality in the two-pass approach may be negligible relative to the one-pass approach.

In general, source device 12 generates coded video data for transmission to destination device 16. In some cases, however, devices 12, 16 may operate in a substantially symmetrical manner. For example, each of devices 12, 16 may include video encoding and decoding components. Hence, system 10 may support one-way or two-way video transmission between video devices 12, 16, e.g., for video streaming, video playback, video broadcasting, or video telephony.

Video source 20 of source device 12 may include a video capture device, such as a video camera, a video archive containing previously captured video, or a video feed from a video content provider. As a further alternative, video source 20 may generate computer graphics-based data as the source video, or a combination of live video, archived video, and computer-generated video. In some cases, if video source 20 is a video camera, source device 12 and destination device 16 may form so-called camera phones or video phones. In each case, the captured, pre-captured or computer-generated video may be encoded by video encoder 22. The encoded video information may then be modulated by modem 23 according to a communication standard, e.g., such as code division multiple access (CDMA) or another communication standard, and transmitted to destination device 16 via transmitter 24. Modem 23 may include various mixers, filters, amplifiers or other components designed for signal modulation. Transmitter 24 may include circuits designed for transmitting data, including amplifiers, filters, and one or more antennas.

Receiver 26 of destination device 16 receives information over channel 15, and modem 27 demodulates the information. Again, the video encoding process may implement the techniques described herein to improve the quantization processes. The video decoding process performed by video decoder 28 may perform inverse quantization in reconstructing the video sequence. Display device 28 displays the decoded video data to a user, and may comprise any of a variety of display devices such as a cathode ray tube, a liquid crystal display (LCD), a plasma display, an organic light emitting diode (OLED) display, or another type of display device.

In the example of FIG. 1, communication channel 15 may comprise any wireless or wired communication medium, such as a radio frequency (RF) spectrum or one or more physical transmission lines, or any combination of wireless and wired media. Communication channel 15 may form part of a packet-based network, such as a local area network, a wide-area network, or a global network such as the Internet. Communication channel 15 generally represents any suitable communication medium, or collection of different communication media, for transmitting video data from source device 12 to destination device 16.

Video encoder 22 and video decoder 28 may operate according to a video compression standard that supports CABAC, such as the ITU-T H.264 standard, alternatively described as MPEG-4, Part 10, Advanced Video Coding (AVC). Although not shown in FIG. 1, in some aspects, video encoder 22 and video decoder 28 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work extensions to H.264/MPEG-4 AVC.

Video encoder 22 and video decoder 28 each may be implemented as one or more microprocessors, digital signal processors (DSPs), application specific integrated circuits (ASICs), field programmable gate arrays (FPGAs), discrete logic, software, hardware, firmware or any combinations thereof. Each of video encoder 22 and video decoder 28 may be included in one or more encoders or decoders, either of which may be integrated as part of a combined encoder/decoder (CODEC) in a respective mobile device, subscriber device, broadcast device, server, or the like.

A video sequence typically includes a series of video frames. Video encoder 22 operates on video blocks within individual video frames in order to encode the video data. The video blocks may have fixed or varying sizes, and may differ in size according to a specified coding standard. Each video frame includes a series of slices. Each slice may include a series of macroblocks, which may be arranged into sub-blocks. As an example, the ITU-T H.264 standard supports intra prediction in various block sizes, such as 16 by 16, 8 by 8, or 4 by 4 for luma components, and 8×8 for chroma components, as well as inter prediction in various block sizes, such as 16 by 16, 16 by 8, 8 by 16, 8 by 8, 8 by 4, 4 by 8 and 4 by 4 for luma components and corresponding scaled sizes for chroma components. Video blocks may comprise blocks of pixel data, or blocks of transformation coefficients, e.g., following a transformation process such as discrete cosine transform or a conceptually similar transformation process. The quantization techniques of this disclosure typically apply to the transformation coefficients of transformed video blocks.

Smaller video blocks can provide better resolution, and may be used for locations of a video frame that include high levels of detail. In general, macroblocks (MBs) and the various sub-blocks may be considered to be video blocks. In addition, a slice may be considered to be a series of video blocks, such as MBs and/or sub-blocks. Each slice may be an independently decodable unit of a video frame. After prediction, a transform may be performed on the 8×8 residual block or 4×4 residual block, and an additional transform may be applied to the DC coefficients of the 4×4 blocks for chroma components or luma component if an intra__16×16 prediction mode is used. Again, following the transformation, the data may still be referred to as being video blocks, i.e., blocks of transform coefficients. The term "coefficients" generally refers to transform coefficients, but may alternatively refer to other types of coefficients or values, such as pixel values, or another type of coefficients.

Following intra- or inter-based predictive coding and transformation techniques (such as the 4×4 or 8×8 integer transform used in H.264/AVC or a discrete cosine transform DCT), quantization may be performed. Quantization is discussed in greater detail below, but generally refers to a process in which coefficients are quantized to possibly reduce the amount of data used to represent the coefficients. The quantization process may reduce the bit depth associated with some or all of the coefficients. For example, an 8-bit value may be rounded down to a 7-bit value during quantization. The quantization techniques of this disclosure account for the fact that CABAC will be performed.

In particular, following quantization, entropy coding may be performed according to a CABAC methodology. This disclosure provides techniques for quantization of the coefficients of video blocks in a manner that can achieve a desirable balance of rate and distortion. The described techniques implement estimations of CABAC in order to improve the quantization and achieve, e.g., a desirable level of quality at a given bit budget for the communication rate.

According to the techniques of this disclosure, video encoder 22 may generate a plurality of sets of quantized coefficients for the video block, wherein each of the sets of quantized coefficients is defined based on an assumption that a particular one of the coefficients of the video block corresponds to a last non-zero coefficient of the video block. Video encoder 22 may estimate a plurality of costs associated with coding the video block via CABAC, wherein the estimated costs are based respectively on different ones of the sets of quantized coefficients, and select a given one of the sets of quantized coefficients associated with a lowest cost. Video encoder 22 may use the selected set of quantized coefficients for quantization of the video block. This approach is referred to as a one-pass approach.

Alternatively, the quantization techniques of this disclosure may follow a two-pass approach. In this case, video encoder 22 may estimate a last non-zero coefficient of the video block in a first pass, and then generate a set of quantized coefficients for the video block in a second pass based on an assumption that the estimated last non-zero coefficient is actually the last non-zero coefficient of the video block. In the two-pass approach, estimation techniques are used to estimate the last non-zero coefficient, and sets of quantized coefficients may only be considered for the case where the estimated last non-zero coefficient is actually the last non-zero coefficient. The separate estimation pass may eliminate the need to perform computations associated with sets of quantized coefficients that do not have the correct coefficient as the last non-zero coefficient.

Figure 2:
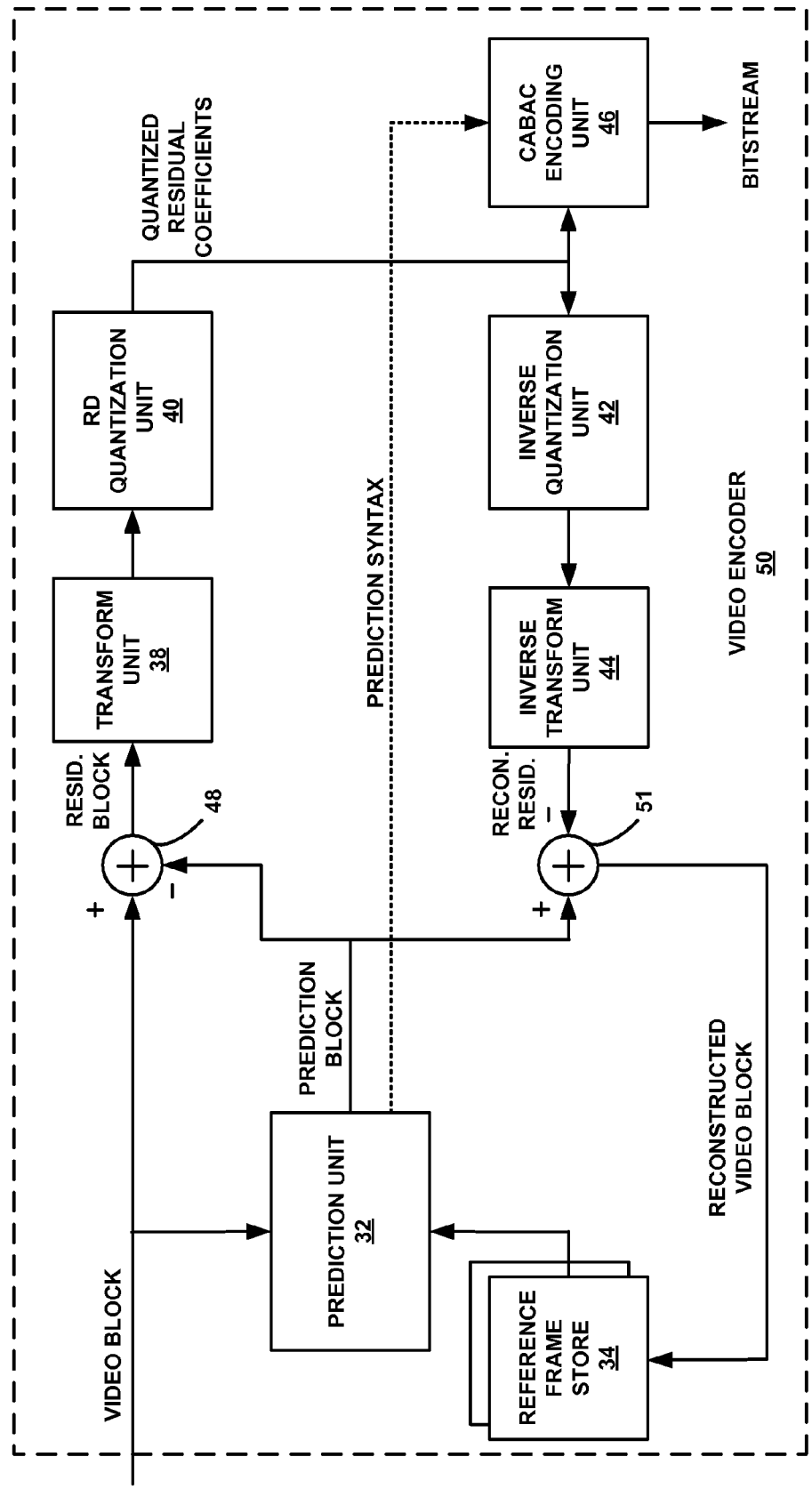
FIG. 2 is a block diagram illustrating an example of a video encoder consistent with this disclosure.

FIG. 2 is a block diagram illustrating an example of a video encoder 50 that includes a rate-distortion (RD) quantization unit 40 that performs quantization of residual coefficients consistent with this disclosure. Video encoder 50 may correspond to video encoder 22 of device 20, or a video encoder of a different device. Video encoder 50 may perform intra- and inter-coding of blocks within video frames. Intra-coding relies on spatial prediction to reduce or remove spatial redundancy in video within a given video frame. Inter-coding relies on temporal prediction to reduce or remove temporal redundancy in video within adjacent frames of a video sequence. For inter-coding, video encoder 50 performs motion estimation to track the movement of matching video blocks between two or more adjacent frames. Intra-mode (I-mode) may refer to the spatial based compression mode and Inter-modes such as prediction (P-mode) or bi-directional (B-mode) may refer to the temporal based compression modes.

As shown in FIG. 2, video encoder 50 receives a current video block within a video frame to be encoded. In the example of FIG. 2, video encoder 50 includes prediction unit 32, reference frame store 34, block transform unit 38, RD quantization unit 40, inverse quantization unit 42, inverse transform unit 44 and CABAC coding unit 46. A deblocking filter (not shown) may also be included to filter block boundaries to remove blockiness artifacts. Video encoder 50 also includes summer 48 and summer 51. Prediction unit 32 generally represents an intra prediction unit and/or a inter prediction unit.

During the encoding process, video encoder 50 receives a video block to be coded, and prediction unit 32 performs predictive coding techniques. For inter coding, prediction unit 32 compares the video block to be encoded to various blocks in one or more video reference frames or slices in order to define a predictive block. For intra coding, prediction unit 32 generates a predictive block based on neighboring data within the same coded unit. Prediction unit 32 outputs the prediction block and adder 48 subtracts the prediction block from the video block being coded in order to generate a residual block.

For inter coding, prediction unit 32 may comprise motion estimation and motion compensation units that identify a motion vector that points to a prediction block and generates the prediction block based on the motion vector. Typically, motion estimation is considered the process of generating the motion vector, which estimates motion. For example, the motion vector may indicate the displacement of a predictive block within a predictive frame relative to the current block being coded within the current frame. Motion compensation is typically considered the process of fetching or generating the predictive block based on the motion vector determined by motion estimation. As noted, for intra coding, prediction unit 32 generates a predictive block based on neighboring data within the same coded unit. One or more intra-prediction modes may define how an intra prediction block can be defined.

Video encoder 50 forms a residual video block by subtracting the prediction video block produced by prediction unit 32 from the original video block being coded. Summer 48 performs this subtraction operation. Transform unit 38 applies a transform, such as a discrete cosine transform (DCT) or a conceptually similar transform, to the residual block, producing a video block comprising residual transform block coefficients. Transform unit 38, for example, may perform other transforms defined by the H.264 standard, which are conceptually similar to DCT. Wavelet transforms, integer transforms, sub-band transforms or other types of transforms could also be used. In any case, transform unit 38 applies the transform to the residual block, producing a block of residual transform coefficients. The transform may convert the residual information from a pixel domain to a frequency domain.

RD quantization unit 40 (also referred to herein as "quantization unit 40") quantizes the residual transform coefficients to further reduce bit rate. In particular, quantization unit 40 performs one or more of the quantization techniques described in greater detail below in order to account for CABAC coding performed by CABAC unit 46. In this way, quantization unit 40 can implement a rate-distortion model and achieve a desired level of quantization that, e.g., achieves a desirable number of bits for a given rate or bit budget.

After quantization, CABAC unit 46 entropy codes the quantized transform coefficients according a CABAC methodology to further compress the data. Following the entropy coding by CABAC unit 46, the encoded video may be transmitted to another device or archived for later transmission or retrieval. Inverse quantization unit 42 and inverse transform unit 44 apply inverse quantization and inverse transformation, respectively, to reconstruct the residual block in the pixel domain for use as a reference block. Summer 51 adds the reconstructed residual block to the motion compensated prediction block produced by motion compensation unit 36 to produce a reconstructed video block for storage in reference frame store 34. The reconstructed video block may be used by prediction unit 32 as a reference block to inter-encode a block in a subsequent video frame.

A prediction error $E(x, y)$, i.e., the difference between the block being encoded $I(x, y)$ and the predicted block $P(x, y)$ may be represented as a weighted sum of transform basis functions $f_{ij}(x, y)$:

$$E(x, y) = \sum_{i=1}^{N} \sum_{j=1}^{N} c_{ij} f_{ij}(x, y)$$

where x and y define a location of a given coefficient within a video block and $c_{ij}$ are weight factors, sometimes called prediction error coefficients. The transform is typically performed on 8×8 (N=8) or 4×4 (N=4) block basis. The weights $c_{ij}$, can be subsequently quantized as follows:

$$l_{ij} = Q(c_{ij}, QP)$$

where $l_{ij}$ are called the quantized coefficients or levels, QP is a quantization parameter, and Q is a quantization matrix that defines the quantization step size. The operation of quantization introduces loss of information. However, the quantized coefficient can be represented with a smaller number of bits, thereby conserving transmission bandwidth, storage space and processing resources. The level of compression (loss of information) is conventionally controlled by adjusting the value of QP.

Quantized transform coefficients, together with motion vectors and some control information, may form a complete coded sequence of elements. Prior to transmission from the encoding device to the decoding device, all of these elements are typically entropy coded so as to further reduce the number of bits needed for their representation.

On the decoder side, the block in the current frame is obtained by first constructing its prediction in the same manner as in the encoder and by adding to the prediction the compressed prediction error. The compressed prediction error is found by applying inverse transform to the de-quantized coefficients as follows:

$$\tilde{E}(x, y) = \sum_{i=1}^{N} \sum_{j=1}^{N} r_{ij} \tilde{f}_{ij}(x, y)$$

where $r_{ij}$ are the dequantized (also called reconstructed) coefficients. The coefficients $r_{ij}$ may be calculated by the inverse quantization:

$$r_{ij} = Q^{-1}(l_{ij}, QP)$$

The difference between the reconstructed frame $R(x,y)$ and the original frame $I(x,y)$ may be referred to as the reconstruction error.

Conventionally, quantization of transform coefficients in video codecs is usually based on uniform-reconstruction quantizers (URQ). The classification rule for quantizing the data is defined by the encoder. One example of quantization is a so-called dead-zone plus uniform threshold quantization (DZ-UTQ) approach. The equation below defines such a dead-zone quantizer, where $f_0$ denotes the dead-zone parameter with $0 \leq f_0 \leq 0.5$:

$$l_{ij} = \text{sgn}(c_{ij}) \cdot \left\lfloor \frac{|c_{ij}|}{QP} + f_0 \right\rfloor$$

where $l_{ij}$ corresponds to a level associated with a given QP.

Conceptually, the reconstruction value $r_{ij}$ that corresponds to the level $l_{ij}$ may be derived by multiplying $l_{ij}$ with the corresponding QP:

$$r_{ij} = l_{ij} \cdot QP$$

Equations $$l_{ij} = \text{sgn}(c_{ij}) \cdot \left\lfloor \frac{|c_{ij}|}{QP} + f_0 \right\rfloor$$

and $r_{ij} = l_{ij} \cdot QP$ represent a mathematically simplified version of what is actually specified for MPEG-4 AVC, since the different scaling factors for normalization of the corresponding basis functions are neglected for purposes of simplicity.

In H.264 and MPEG-4 AVC, quantization may be performed according to the following equation:

$$l_{ij} = \text{sgn}(c_{ij})[|c_{ij}| \cdot Q(QP \% 6, i, j) + f]/2^{15+QP/6}, i, j = 0, \ldots, 3$$

where Q represents a quantization matrix, % represents modular division, and f is equal to $2^{15+QP/6}/3$ for intra frames and $2^{15+QP/6}/6$ for inter frames. De-quantization of coefficients may be performed according to the following equation:

$$r_{ij} = l_{ij} \cdot R(QP \% 6, i, j), i, j = 0, \ldots, 3$$

where R represent the de-quantization matrix. The values associated with Q and R for QP % 6=0,1, . . . , 5 and may be pre-calculated and stored.

Figure 3:
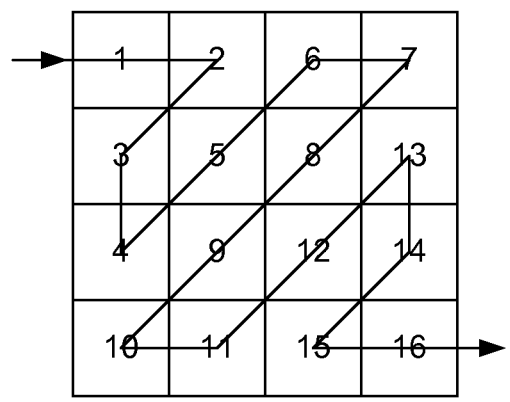
FIG. 3 is a conceptual diagram illustrating zig-zag scanning of a four-by-four element video block.

Coefficients in a given block may be ordered (scanned) using zigzag scanning or another scanning order, resulting in a one-dimensional ordered coefficient vector. Scanning, such as zigzag scanning, may also be referred to as serialization, in that it produces a one-dimensional series of coefficients, in contrast to the two-dimensional pattern defined by the block. An example zigzag scan for a 4×4 block appears in FIG. 3. Zigzag scanning generally presumes that after applying a two-dimensional (2D) transform, the transform coefficients having most energy (i.e. higher value coefficients) correspond to low frequency transform functions and are located towards the top-left of the block as it is depicted in FIG. 3. Hence, in a coefficient vector produced through zigzag scanning, the higher magnitude coefficients will most likely appear towards the start of the one-dimensional ordered coefficient vector. After quantization, most of the low energy coefficients may be equal to 0.

CABAC is one method of coding transform coefficients used in H.264/AVC. CABAC encoding unit 46 of FIG. 2 may perform such coding. In general, coding any data symbol using CABAC may involve the following stages: binarization, context model selection, arithmetic encoding and probability updating. For binarization, CABAC unit 46 converts any non-binary-valued symbol into a binary code prior to arithmetic coding. In context model selection, CABAC unit 46 chooses a context model from a selection of available models, e.g., depending on the statistics associated with recently-coded data symbols. A "context model" is a probability model for one or more bins of the binarized symbol. This model may be chosen from a selection of available models depending on the statistics of recently-coded data symbols. The context model stores the probability of each bin being "1" or "0."

For arithmetic encoding, CABAC unit 46 encodes each bin according to the selected probability model (also referred to as a context model). The selected probability model is updated (probability updating) based on the actual coded value (e.g. if the bin value was "1", the frequency count of "1"s is increased). Probability estimation in CABAC may be based on a table-driven estimator using a finite-state machine (FSM). In this case, each probability model in CABAC may take one out of 128 different states with associated probability values p. Probability update may be performed by a transition process between sixty-four separate probability states for the "Least Probable Symbol" which is the least probable of the two binary decisions "0" or "1." The context model selection, arithmetic encoding and probability updating may be repeated for each bit (or "bin") of the binarized symbol.

Transform coefficient using CABAC by CABAC unit 46 includes coding of a so-called significance map and coding of non-zero coefficients. If the block has non-zero coefficients, a binary-valued significance map is encoded. For each coefficient in scanning order, a one-bit symbol significant_coeff_flag is transmitted. If the significant_coeff_flag symbol is one, i.e., if a nonzero coefficient exists at the respective scanning position, a further one-bit symbol last_significant_coeff_flag is sent. This last_significant_coeff_flag symbol indicates if the current non-zero coefficient is the last non-zero inside the block (last_significant_coeff_flag=1) or if further non-zero coefficients follow (last_significant_coeff_flag=0).

For encoding the significance map, up to fifteen different probability models can be used for both the significant_coeff_flag and the last_significant_coeff_flag. The choice of the models, and thus the corresponding context index, may depend on the scanning position. For encoding non-zero levels coeff_abs_level_minus $1=|l_{ij}|-1$, ten contexts may be used, with five of the contexts being for coding the first bit of a binary representation and the other five dedicated to coding the second to 14th bits. The contexts may be selected by CABAC unit 46 as follows:

1. Parameters NumLg1 and NumEq1 are set equal, respectively, to the number of coefficients encoded so far in the block that are greater than one and equal to one. Non-zero levels are encoded, and hence parameters NumLg1 and NumEq1 are updated, in reverse scan order, i.e., coefficients corresponding to the high frequency transform functions are encoded first.

2. The context for the first bit of a binarized symbol can be determined by:

$$Ctx_1 = \begin{cases} 0 & NumLg1 > 0 \\ \min(4, 1 + NumEq1) & \text{otherwise} \end{cases}$$

3. The context for the 2nd to 14th bits of the binarized symbol can be selected by:

$$Ctx_2 = \min(4, NumLg1).$$

CABAC unit 46 may also support a bypass mode with a fixed distribution. Other bits in the binary representation of coeff_abs_level_minus 1 may pass through the bypass mode. Finally, signs of the non-zero coefficients can be sent using one bit for each non-zero coefficient, e.g., where 1 indicates positive and 0 indicates negative (or vice versa).

It is desirable to find, for each N×N video block, given its transform coefficients $c_{ij}$, the corresponding quantized coefficients $l_{ij}$ (which determine reconstructed coefficients $r_{ij}$) such that the mean-squared-error (MSE) distortion D between the prediction error E(x,y) and the reconstructed version of the prediction error $\tilde{E}(x,y)$ is minimized subject to a constraint in the rate R for coding the coefficients. Put another way, the goal is to minimize the following expression:

$$\min[D(E(x,y)-\tilde{E}(x,y))] \text{ subject to } R < R_{budget}$$

Other additive distortion metrics could be used instead of MSE, e.g., activity-weighted MSE. The rate-constrained problem of minimizing the equation above can be solved by being converted to an equivalent unconstrained problem by "merging" rate and distortion through use of the Lagrange multiplier λ. In this case, the unconstrained problem becomes the determination (for a fixed λ) of the coefficient levels, which results in the minimum total Lagrangian Cost defined as:

$$J(\lambda)=D(E(x,y)-\tilde{E}(x,y))+\lambda R$$

In case of H.264, the square reconstruction error $$D = (E(x,y) - \tilde{E}(x,y))^2$$
$$= \left( \sum_{i=1}^{N} \sum_{j=1}^{N} c_{ij} f_{ij}(x,y) - \sum_{i=1}^{N} \sum_{j=1}^{N} r_{ij} f_{ij}(x,y) \right)^2$$

for a given block is proportional to the square quantization error:

$$\sum_{i=1}^{N}\sum_{j=1}^{N}(r_{ij}-c_{ij})^2.$$

The rate R is the number of bits required to code quantized coefficients $l_{ij}$.

The proposed algorithms discussed below find quantized coefficients values $l_{ij}$ for which the value of the total Lagrangian Cost function $J(\lambda)$ is close to its minimum.

Since the transform used in MPEG-4 AVC is orthogonal, the Lagrangian Cost $J(\lambda)$ can be calculated as:

$$J(\lambda) = \sum_{i=1}^{N}\sum_{j=1}^{N} J(\lambda, c_{ij}, l_{ij}).$$

In this case, $J(\lambda,c_{ij},l_{ij})$ is the Lagrangian Cost for the coefficient $c_{ij}$ when quantized to level $l_{ij}$. In other words:

$$J(\lambda,c_{ij},l_{ij})=\text{err}(c_{ij},l_{ij})+\lambda\cdot\text{bits}(l_{ij}).$$

The quantization error err($c_{ij},l_{ij}$) is proportional to $(r_{ij}-c_{ij})^2$:

$$\text{err}(c_{ij},l_{ij})=N(QP\%6,i,j)\cdot(r_{ij}-c_{ij})^2.$$

Again, QP represents the quantization parameter and % represents modular division. N(QP % 6,i,j) represents a normalization matrix. Encoding quality typically increases as the QP gets smaller. That is, smaller values of QP typically correspond to less quantization and thus, higher quality encoding. Alternatively, encoding quality could decrease as QP gets smaller, if QP were defined in such a manner.

In the case of quantization and de-quantization matrices Q and R, values of normalization matrix N(QP % 6,i,j) may depend only on the location in the block specified by i and j and value of QP % 6=0, 1, . . . , 5. The number of bits ("bits($l_{ij}$)") required to code value $l_{ij}$ may be calculated by encoding $l_{ij}$ using a portion of CABAC, e.g., as defined for ITU H.264. However, rather than perform all of the CABAC steps, RD quantization unit 40 may only perform the first two steps of CABAC for purposes of quantization. These first two steps include binarization and context model selection. Then, instead of invoking an arithmetic coder to perform binary arithmetic coding, RD quantization unit 40 may estimate the number of bits required to code each bin. Assuming that the context selected for a given bin corresponds to state m in a finite-state machine, the estimated number of bits required to code a given bin may be represented as the entropy of the probability p assigned to state m. It may be sufficient for RD quantization unit 40 to determine contexts for each bin once per mackroblock.

For each coefficient $c_{ij}$ at most 3 possible values of level $|l_{ij}|$ can be tested: 0, $l_{ij}^{floor}$ and $l_{ij}^{ceil}$. As with the single pass example, in this two-pass approach, 4×4 block values $l_{ij}^{floor}$ and $l_{ij}^{ceil}$ may be calculated as follows:

$$l_{ij}^{float}=|c_{ij}|\cdot Q(QP\%6,i,j)/2^{15+QP/6},$$

$$l_{ij}^{floor}=\text{floor}(l_{ij}^{float}),$$

$$l_{ij}^{ceil}=l_{ij}^{floor}+1.$$

One may assume that the coefficients in a given block are ordered (scanned) using zigzag scanning, which results in a one-dimensional ordered coefficient vector. The ordered coefficients can be denoted as $c_i$, where i=0, . . . , M, and, e.g., M is equal to 15 for 4×4 blocks and 63 for 8×8 blocks.

In accordance with this disclosure, RD quantization unit 40 may generate the quantized coefficients/levels $l_i$ as follows:
 1. Calculate Lagrangian Cost $J_k(\lambda)$ and generate vector of quantized coefficients $l_k$ assuming that coefficient $c_k$, k=M, M−1, . . . , 0, is the last nonzero coefficient in the block, i.e, last_significant_coeff_flag for scanning position k is equal to 1.
    a. For each coefficient $c_i$, i=k−1, . . . , 0, calculate its Lagrangian Cost $J(\lambda,c_i,l_i)$ when the quantized value $l_i$ is equal to preselected set of values, e.g., 0, $l_{floor}$ and $l_{ceil}$.
 2. Pick the value of $l_i$ for which $J(\lambda,c_i,l_i)$ is minimized and update Lagrangian Cost $J_k(\lambda)$ using $J(\lambda,c_i,l_i)$ corresponding to selected value of $l_i$.

The speed of the quantization techniques performed by RD quantization unit 40 may be increased as follows.
 1. If coefficient $c_i$ is closer (as measured by for example by absolute distance between $l_{float}$ and $l_{floor}$ or $l_{ceil}$) to $l_{floor}$ than to $l_{ceil}$ only value $l_{floor}$ may be considered in step 1.a above.
 2. If coefficient $c_k$ is closer to $l_{floor}$ than to $l_{ceil}$ and $l_{floor}$ is equal to zero, coefficient $c_k$ can not be the last nonzero coefficient. Hence, in this case, the calculation of Lagrangian Cost $J_k(\lambda)$ may be skipped for this value of k.
 3. The calculation of $J_k(\lambda)$ may be terminated when $J_k(\lambda)$ starts to increase with decreasing k.

In summary, RD quantization unit 40 may quantize coefficients of a video block for a video coding process that supports CABAC. RD quantization unit 40 may generate a plurality of sets of quantized coefficients for the video block, wherein each of the sets of quantized coefficients are defined based on assumptions that a particular one of the coefficients of the video block corresponds to a last non-zero coefficient of the video block, estimate a plurality of costs associated with coding the video block via the CABAC, wherein the estimated costs are based respectively on different ones of the sets of quantized coefficients, select a given one of the sets of quantized coefficients associated with a lowest cost, and output the given one of the sets of quantized coefficients to CABAC encoding unit 46. CABAC encoding unit 46 may then perform the CABAC process on the given one of the sets of quantized coefficients to entropy code the given one of the sets of quantized coefficients into a bitstream, and output the bitstream.

Quantization unit 40 may estimate the costs by calculating Lagrangian cost functions associated with a rate-distortion model. A particular cost associated with the selected one of the sets of quantized coefficients defines a lowest number of bits associated with the plurality of costs. Quantization unit 40 may store a value indicative of the lowest number of bits, which is associated with the particular cost.

The Lagrangian cost functions may define sets of individual coefficient Lagrangian costs associated each of the quantized coefficients in the sets of quantized coefficients. Quantization unit 40 calculates the sets of individual coefficient Lagrangian costs associated with the quantized coefficients in the sets of quantized coefficients for values of the quantized coefficients equal to zero, a floor value and a ceiling value. Examples of these values are described above. In general, the floor value is based on an absolute value of an individual one of the coefficients of the video block, a quantization parameter, and a quantization matrix, and the ceiling value comprises the floor value plus one.

In order to accelerate this quantization process, quantization unit 40 may implement acceleration techniques like those mentioned above. For example, for an individual one of the quantized coefficients, if the individual one of the quantized coefficients is closer to the floor value than the ceiling value, quantization unit 40 may skip calculation of an individual coefficient Lagrangian cost associated with the individual one of the quantized coefficients for values equal to the ceiling value.

Also, if the particular one of the coefficients of the video block corresponding to the last non-zero coefficient of the video block for one of the sets of quantized coefficients defines a value closer to the floor value than the ceiling value and if the floor value is equal to zero, RD quantization unit 40 may skip estimating a particular cost associated with coding the video block for that one of the sets of quantized coefficients. In addition, RD quantization unit 40 may terminate estimating the plurality of costs associated with a particular one of the sets when a summation to define a particular Lagrangian cost associated with the particular one of the sets starts to increase with decreasing values of the coefficients of the video block. These or other techniques may be used to accelerate the quantization process without degrading quality in the encoded video.

Figure 4:
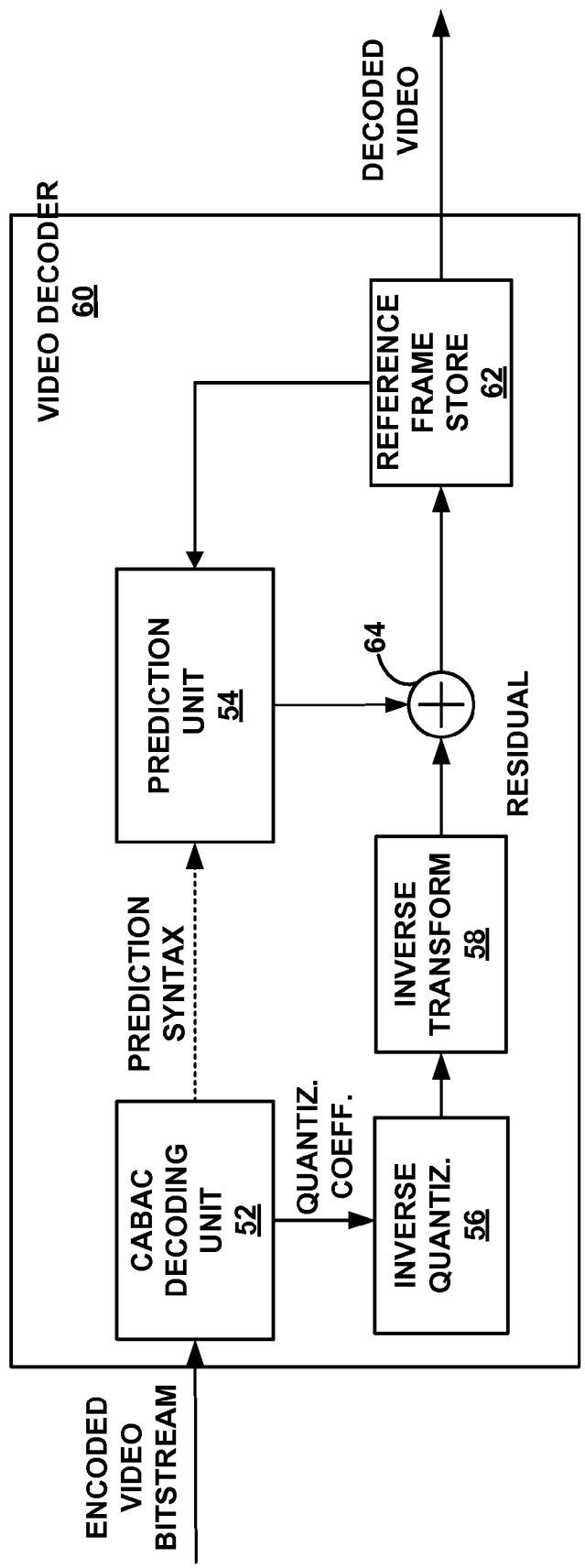
FIG. 4 is a block diagram illustrating an example of a video decoder consistent with this disclosure.

FIG. 4 is a block diagram illustrating an example of a video decoder 60, which decodes a video sequence that is encoded in the manner described herein. Video decoder 60 includes a CABAC decoding unit 52 that performs the reciprocal decoding function of the encoding performed by CABAC unit 46 of FIG. 3.

Video decoder 60 may perform intra- and inter-decoding of blocks within video frames. In the example of FIG. 4, video decoder 60 includes CABAC decoding unit 52 (mentioned above), motion compensation unit 54, inverse quantization unit 56, inverse transform unit 58, and reference frame store 62. Video decoder 60 also includes summer 64. Optionally, video decoder 60 also may include a deblocking filter (not shown) that filters the output of summer 64. FIG. 4 illustrates the temporal prediction components of video decoder 60 for inter-decoding of video blocks. Although not shown in FIG. 4, video decoder 60 also may include spatial prediction components for intra-decoding of some video blocks.

Following the CABAC decoding performed by CABAC decoding unit 52, motion compensation unit 54 receives the motion vectors and one or more reconstructed reference frames from reference frame store 62. Inverse quantization unit 56 inverse quantizes, i.e., de-quantizes, the quantized block coefficients. The inverse quantization process may be a conventional process as defined by H.264 decoding. Inverse transform unit 58 applies an inverse transform, e.g., an inverse DCT or conceptually similar inverse transform process, to the transform coefficients in order to produce residual blocks in the pixel domain. Motion compensation unit 54 produces motion compensated blocks that are summed by summer 64 with the residual blocks to form decoded blocks. If desired, a deblocking filter may also be applied to filter the decoded blocks in order to remove blockiness artifacts. The filtered blocks are then placed in reference frame store 62, which provides reference blocks from motion compensation and also produces decoded video to a drive display device (such as device 28 of FIG. 1).

Figure 5:
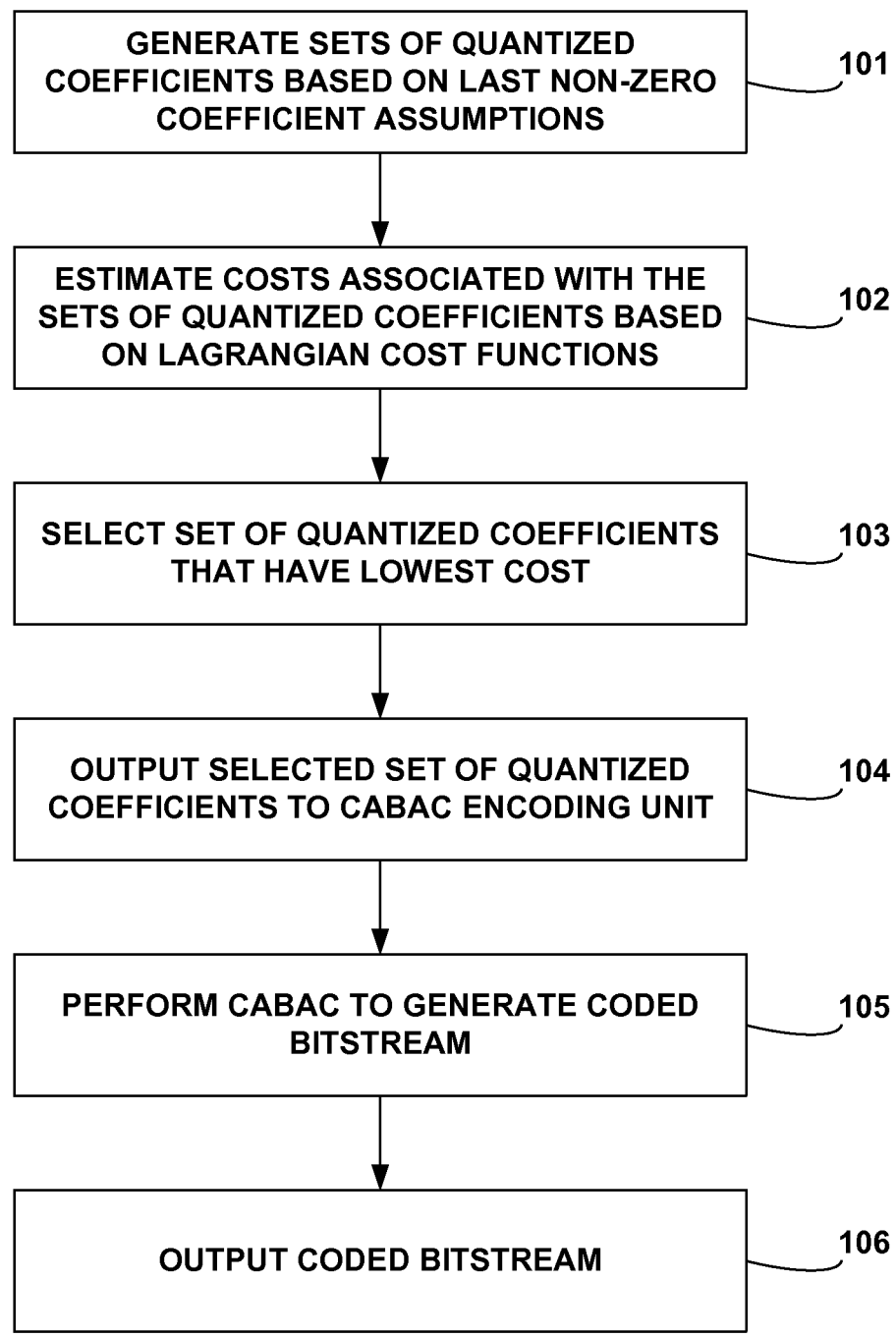
FIG. 5 is a flow diagram illustrating a one pass technique consistent with this disclosure.

FIG. 5 is a flow diagram illustrating a one-pass technique performed by video encoder 50. As shown, rate-distortion (RD) quantization unit 40 generates sets of quantized coefficients based on non-zero coefficient assumptions (101). In particular, RD quantization unit 40 assumes that a given coefficient is a last non-zero coefficient, and based on this assumption calculates sets of coefficients for the video block. RD quantization unit 40 next assumes that another coefficient is a last non-zero coefficient, and based on this assumption generates another set of coefficients for the video block, and so forth.

For each of the sets of quantized coefficients, quantization unit estimates costs based on Lagrangian cost functions (102). In particular, for each set, RD quantization unit 40 determines individual Lagrangian cost functions for each coefficient at a plurality of possible values, e.g., zero, a floor value, and a ceiling value. The floor value may be based on an absolute value of an individual one of the coefficients of the video block, a quantization parameter, and a quantization matrix (or a parameter thereof), and the ceiling value may comprise the floor value plus one.

RD quantization unit 40 selects the set of quantized coefficients that have the lowest overall Lagrangian cost (103). In particular, RD quantization unit 40 sums the lowest individual Lagrangian costs for each coefficient for a set, and repeats this process for each possible set. Again the Lagrangian costs balance costs of rate and distortion. RD quantization unit 40 selects the set having the overall lowest Lagrangian (103), and RD quantization unit 40 outputs the selected set of quantized coefficients to CABAC encoding unit 46 (104). CABAC encoding unit 46 performs CABAC based on the selected set of quantized coefficients and any other syntax parameters to generate a coded bitstream (105), and outputs the coded bitstream (106).

Figure 6:
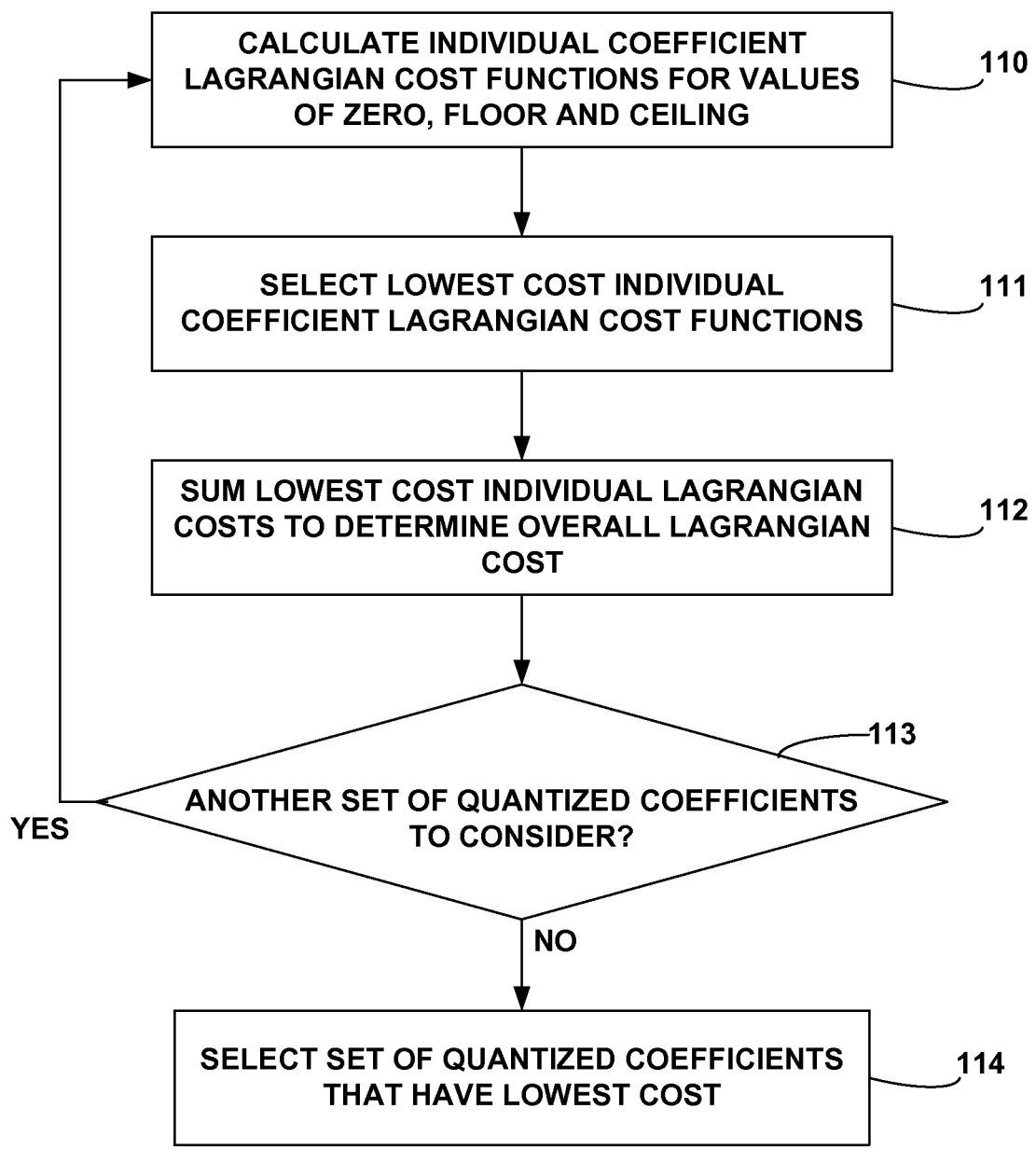
FIG. 6 is a flow diagram illustrating a technique for estimating costs consistent with this disclosure.

FIG. 6 is another flow diagram illustrating, in greater detail, an exemplary process of estimating costs. In particular, quantization unit 40 calculates individual Lagrangian cost functions for each coefficient for values of zero, a floor value, and a ceiling value. Again, the floor value may be based on an absolute value of an individual one of the coefficients of the video block, a quantization parameter, and a quantization matrix (or a parameter mapped from the matrix), and the ceiling value may comprise the floor value plus one.

As noted above, one example of how RD quantization unit 40 can calculate floor value ($l_{floor}$) and ceiling value ($l_{ceil}$) for coefficient $c_{ij}$ for 4×4 block are as follows:

$$l_{float} = |c_{ij}| \cdot Q(QP \% 6, i, j) / 2^{15+QP/6},$$

$$l_{floor} = \text{floor}(l_{float}),$$

$$l_{ceil} = l_{floor} + 1.$$

Again, the operation floor($l_{float}$) represents the lowest value associated with $l_{float}$, QP represents the quantization parameter, and Q represents the quantization matrix such as a quantization matrix defined for H.264/AVC. Values of QP % 6, i and j may be used to define a parameter from matrix Q. The function % represents modular division.

RD quantization unit 40 selects lowest cost individual coefficient Lagrangian cost functions for each coefficient (111), and determines the overall Lagrangian cost for the set (112), e.g., by summing the selected individual coefficient Lagrangian costs. RD quantization unit 40 repeats this process of steps (110-112) if there is another set of quantized coefficients to consider (yes branch 113). In particular, for each set of coefficients defined by the assumption that a given coefficient is the last non-zero coefficient, quantization unit 40 repeats this process of steps (110-112). Once the overall Lagrangian cost has been determined for each possible set of quantized coefficients (defined by the last non-zero coefficient assumptions), RD quantization unit 40 selects the set of quantized coefficients that have the lowest overall Lagrangian cost (114).

Figure 7:
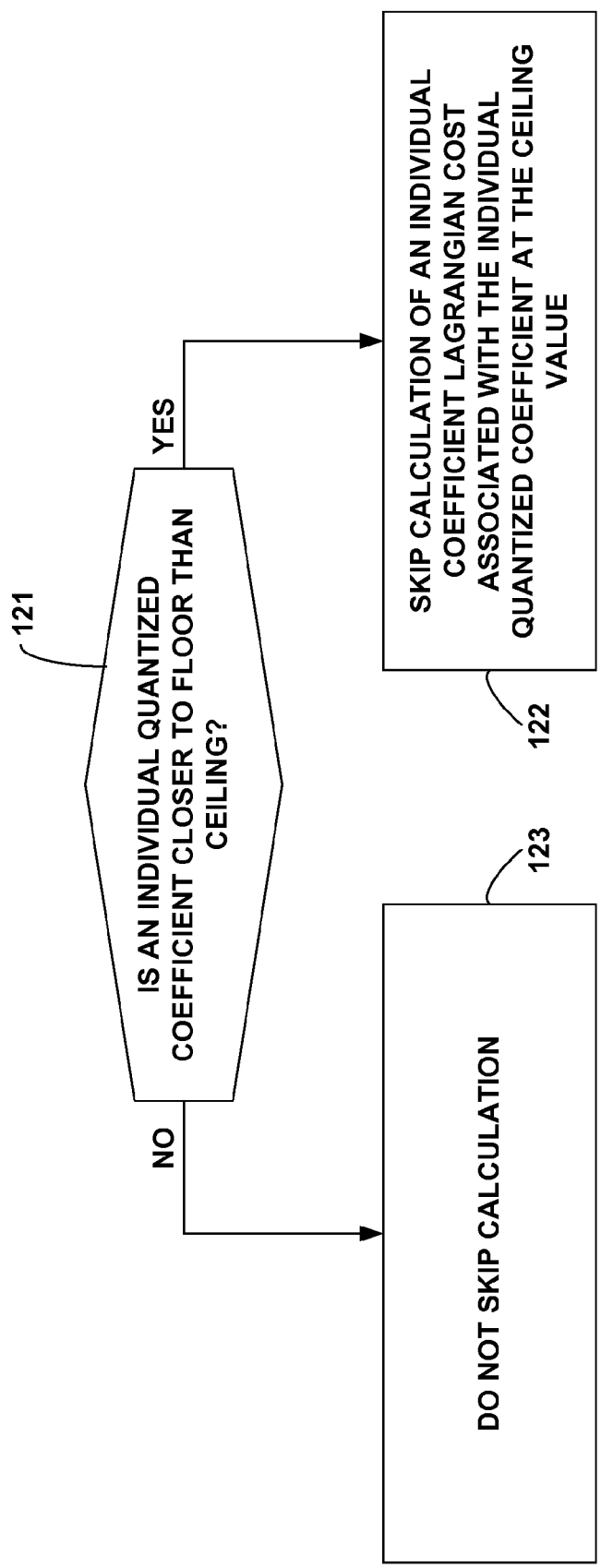
FIG. 7 is a flow diagram illustrating a technique for accelerating a quantization process consistent with this disclosure.
Figure 8:
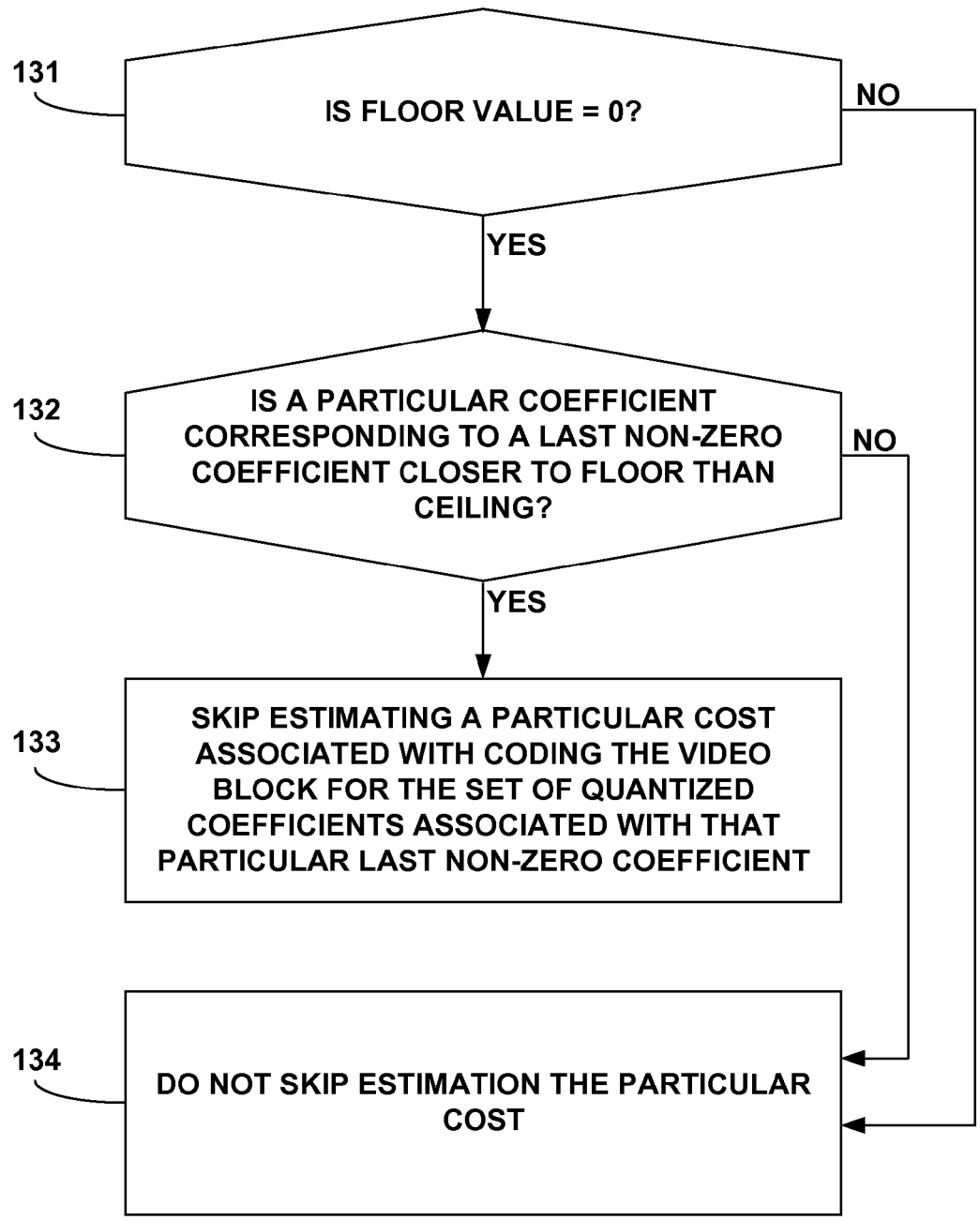
FIG. 8 is a flow diagram illustrating a technique for accelerating a quantization process consistent with this disclosure.
Figure 9:
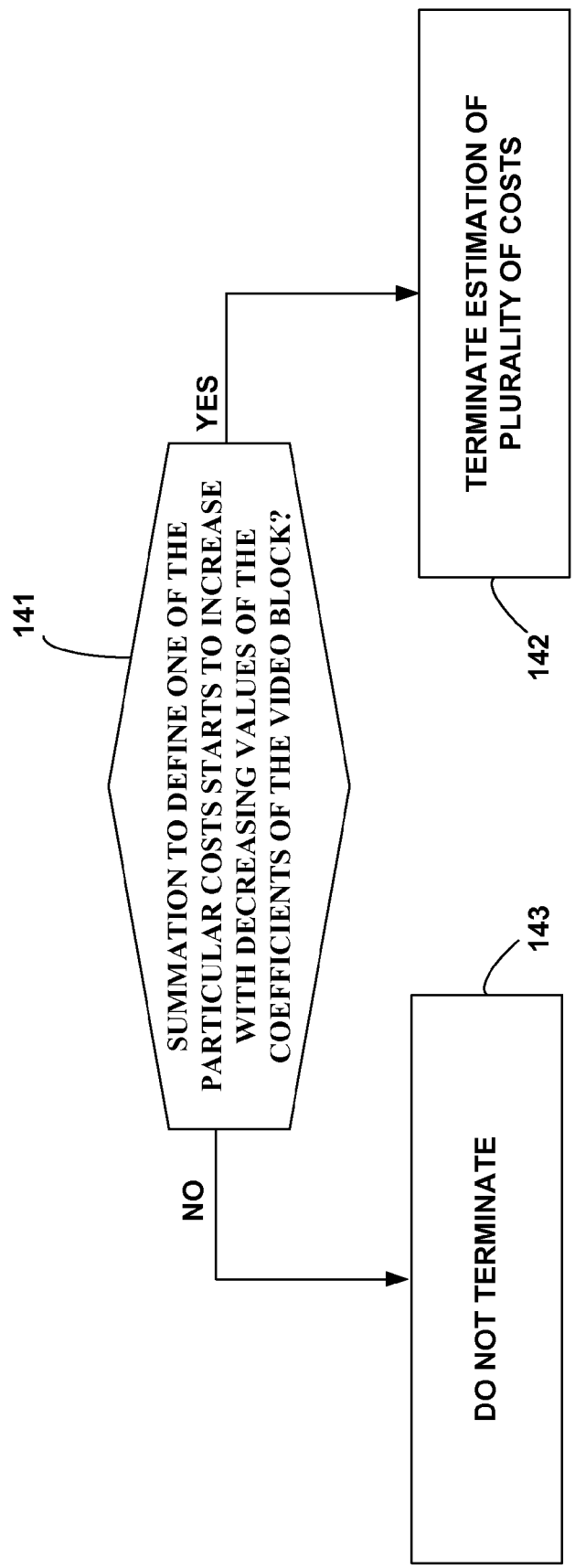
FIG. 9 is a flow diagram illustrating a technique for accelerating a quantization process consistent with this disclosure.

FIGS. 7-9 illustrate optional techniques that may be used to accelerate the quantization process without substantially sacrificing quality in the quantized coefficients. The techniques of FIGS. 7-9 may be used individually or collectively. The techniques of FIGS. 7-9 are most applicable to the one-pass quantization process, but some of these techniques (particularly the techniques of FIG. 7) may also be useful in the two-pass quantization addressed in greater detail below. As shown in FIG. 7, if an individual quantized coefficient is closer to the floor than the ceiling (yes branch of 121), RD quantization unit 40 may skip calculation of an individual coefficient Lagrangian cost associated with the individual quantized coefficient at the ceiling value (122). In this case, RD quantization unit 40 may assume that the individual coefficient Lagrangian cost associated with the individual quantized coefficient will be minimized at either zero or the floor value. Accordingly, in this case, RD quantization unit 40 may avoid the unnecessary computations associated with calculation of a Lagrangian cost associated with the individual quantized coefficient at the ceiling value. The calculation is not skipped (123), however, if the individual quantized coefficient is not closer to the floor than the ceiling (no branch of 121).

In the technique of FIG. 8, RD quantization unit 40 determines whether the floor value is equal to zero (131) and whether a particular coefficient corresponding to a last non-zero coefficient is closer to the floor than the ceiling (132). If both of these contingencies are true (yes branch of 131 and yes branch of 132), then RD quantization unit 40 may skip estimating a particular cost associated with coding the video block for a particular set of quantized coefficients associated with that particular last non-zero coefficient (133). In this case, RD quantization unit 40 may assume that the overall Lagrangian cost for that particular set of quantized coefficients will not comprise the minimum, and will not be selected even if the value is fully computed. Therefore, computations of the particular cost may be skipped in this case. However, if either of these contingencies are false (no branch of 131 or no branch of 132), then RD quantization unit 40 does not skip estimation of the particular cost (134). The technique of FIG. 8 is another way for RD quantization unit 40 to avoid some unnecessary computations.

In the technique of FIG. 9, RD quantization unit 40 monitors the summations that define the particular costs, i.e., monitors the summation of the individual Lagrangian costs for each of the quantized coefficients to define the overall Lagrangian cost associated with a given set of coefficients. If the summation to define one of the particular costs starts to increase with decreasing values of the coefficients of a video block (yes branch of 141), RD quantization unit 40 terminates the estimation of the plurality of costs for that set (142). In this case, RD quantization unit 40 may assume that the overall Lagrangian cost associated with that given set of coefficients will not be the overall minimum. Accordingly, computations may be avoided when the contingency of step 141 is identified (yes branch of 141). Computations are not terminated (143) when the summation does not increase with decreasing values of the coefficients of a video block (no branch of 141).

As mentioned above, this disclosure also contemplates a two-pass approach. In the two-pass approach, the techniques of this disclosure may include estimating a last non-zero coefficient of the video block in a first pass, and then generating a set of quantized coefficients for the video block in a second pass based on an assumption that the estimated last non-zero coefficient is actually the last non-zero coefficient of the video block. The separate estimation pass may eliminate the need to perform computations associated with sets of quantized coefficients that do not have the correct coefficient as the last non-zero coefficient. In accordance with this disclosure, RD quantization unit 40 may generate the quantized coefficients according to this two-pass approach as outlined in greater detail below.

Like the single pass approach the proposed two-pass algorithm discussed below finds quantized coefficients values $l_{ij}$ for which the value of the total Lagrangian Cost function $J(\lambda)$ is close to its minimum. The two-pass approach may be characterized by lower complexity than methods of minimizing the total Lagrangian Cost function $J(\lambda)$ based on an exhaustive search.

For each coefficient $c_{ij}$ at most 3 possible values of level $|l_{ij}|$ can be tested: 0, $l_{ij}^{floor}$ and $l_{ij}^{ceil}$. As with the single pass example, in this two-pass approach, 4×4 block values $l_{ij}^{floor}$ and $l_{ij}^{ceil}$ may be calculated as follows:

$$l_{ij}^{float} = |c_{ij}| \cdot Q(QP \% 6, i, j)/2^{15+QP/6},$$

$$l_{ij}^{floor} = \text{floor}(l_{ij}^{float}),$$

$$l_{ij}^{ceil} = l_{ij}^{floor} + 1$$

Furthermore, to reduce complexity, if coefficient $c_{ij}$ is closer to $l_{ij}^{floor}$ than to $l_{ij}^{ceil}$ (e.g., as measured by absolute distance between $l_{ij}^{float}$ and $l_{ij}^{floor}$ or $l_{ij}^{ceil}$) only value $l_{ij}^{floor}$ is considered. If $c_{ij}$ is closer to level 0 than 1 it may be assigned level 0 without any further analysis. Put another way, techniques of FIG. 7 may be applied during the second pass of the two-pass approach.

One may assume that coefficients in a given block are ordered (scanned) using zigzag scanning (e.g., as shown in FIG. 3), resulting in a one-dimensional ordered coefficient vector. The ordered coefficients can be denoted as $c_i$, where i=0, . . . ,M, and e.g., M is equal to 15 for 4×4 blocks and 63 for 8×8 blocks.

RD quantization unit 40 may use the following symbols in order to calculate the bits needed to code value of $l_i$ in addition to the sign bit:

significant_coeff_flag, which indicates whether a coefficient is non-zero last_significant_coeff_flag, which identifies the last non-zero coefficient, and coeff_abs_level_minus1, which represents the absolute value minus 1 of a coefficient.

In case of significant_coeff_flag and last_significant_coeff_flag, the context, and hence the bits required to code the symbols may depend only on scanning position i. However, contexts for bins of coeff_abs_level_minus1 (e.g., including a first bin—greater_than_1 symbol) may depend on values of other non-zero levels scanned in the inverse order. In other words, contexts for $l_i$ depend on values of quantized coefficients with indices j, where j>i.

Hence, RD quantization unit 40 may obtain quantized coefficients/levels $l_i$ in two separate passes. In the first pass, RD quantization unit 40 may estimate which coefficient should be the last non-zero coefficient. This estimated last non-zero coefficient can be denoted as $c_k$. In the second pass, RD quantization unit 40 can determine and generate final values of quantized coefficients assuming that coefficient $c_k$ is actually the last nonzero coefficient in the block.

In implementation, only coefficients $c_{i_0}, \ldots, c_{i_1}$ may be considered in the first pass by RD quantization unit 40, where:

$i_1$ is the largest value of i for which $l_i^{float} > 0.5$, and $i_0$ is the largest value of i for which $l_i^{float} > 1$, or if such an index does not exist $i_0 = 0$.

Furthermore, in order to reduce complexity, the value of $J_{sum}$ may be pre-calculated as a sum of quantization errors err($c_i, l_i$) when coefficients $c_i$, i=$i_0$, . . . ,$i_1$, are quantized to $l_i$=0 as follows:

$$J_{sum} = \sum_{i=i_0}^{i_1} err(c_i, 0).$$

RD quantization unit 40 may execute some or all of the following steps in the first pass, which is used to estimate the last non-zero coefficient of a video block.

1) If for coefficient $c_{i_0}$, $1_{i_0}^{float} > 1.5$:
   a) Update value of $J_{sum}$:

$J_{sum} = J_{sum} - err(c_{i_0}, 0)$.

b) Calculate approximation of Lagrangian Cost $J_{i_0}(\lambda)$ of the block when $c_{i_0}$ is the last nonzero coefficient as:

$J_{i_0}(\lambda) = J_{sum} + \lambda \cdot (\text{bits}_{last=1} - \text{bits}_{last=0})$.

In this case, $\text{bits}_{last=1}$ is an approximation of the number of bits required to indicate that $c_{i_0}$ is the last non-zero coefficient (i.e., number of bits to encode last_significant_coeff_flag equal to 1). Furthermore, $\text{bits}_{last=0}$ is an approximation of the number of bits required to indicate that $c_{i_0}$ is not the last non-zero coefficient (i.e., number of bits to encode last_significant_coeff_flag equal to 0).

c) Update the starting index $i_0$ to $i_0 = i_0 + 1$.

2) For coefficients $c_i$ where $i = i_0, \ldots, i_1$:
   a) Update value of $J_{sum}$:

$J_{sum} = J_{sum} - err(c_i, 0)$.

b) Find Lagrangian Cost $J(\lambda, c_i, 0)$ when $c_i$ is quantized to 0.
   c) If coefficients $c_i$ is closer to 0 than to 1, calculate update value of $J_{sum}$ as follows:

$J_{sum} = J_{sum} + J(\lambda, c_i, 0)$ d) If coefficients $c_i$ is closer to 1 than to 0, calculate two additional values of Lagrangian Cost:
      i) $J_{last=0}(\lambda, c_i, 1)$–$c_i$ is quantized to 1 and is not the last nonzero coefficient,
      ii) $J_{last=1}(\lambda, c_i, 1)$–$c_i$ is quantized to 1 is the last nonzero coefficient.
   Update value of $J_{sum}$:

$J_{sum} = J_{sum} + \min(J(\lambda, c_i, 0), J_{last=0}(\lambda, c_i, 1))$.

The approximation of Lagrangian Cost $J_i(\lambda)$ when $c_i$ is the last nonzero coefficient is:

$J_i(\lambda) = J_{sum} + J_{last=1}(\lambda, c_i, 1)$

When calculating bits needed to code value of quantized coefficient equal to 1 RD quantization unit 40 fixes the context for greater_than__1 symbol to be one of the 5 possible values.

The coefficient $c_k$ with the smallest corresponding value of $J_k(\lambda)$ is assumed to be the last nonzero coefficient in the block.

In the steps above, RD quantization unit 40 estimates a last non-zero coefficient of a video block without explicitly considering every possible scenario for every possible last non-zero coefficient. In this case, RD quantization unit 40 estimates the last non-zero coefficient by approximating costs associated with coding the video block via the CABAC. Different ones of the approximated costs correspond to different coefficients being the last non-zero coefficient. The final estimated last non-zero coefficient defines a lowest approximated cost. Step 1 may be considered a special case, while step 2 may be performed with respect to most coefficients.

In the steps above, RD quantization unit 40 defines the different ones of the approximated costs in a sequential fashion by sequentially considering each of the coefficients of the video block as being the last non-zero coefficient. In doing so, RD quantization unit 40 sequentially adjusts an accumulated cost upward and downward when considering each of the coefficients of the video block as being the last non-zero coefficient. In particular, the step 2 (a) above, where $J_{sum}$ is updated as $J_{sum} = J_{sum} - err(c_i, 0)$, may cause the accumulated cost to be reduced. In this case, step 2 (a) may cause $J_{sum}$ to become smaller. On the other hand, steps 2 (c) and 2 (d), where the value of $J_{sum}$ is updated as $J_{sum} = J_{sum} + J(\lambda, c_i, 0)$ or as $J_{sum} = J_{sum} + \min(J(\lambda, c_i, 0), J_{last=0}(\lambda, c_i, 1))$, may cause the accumulated cost to become larger. Thus, RD quantization unit 40 defines the different ones of the approximated costs in a sequential fashion by sequentially considering each of the coefficients of the video block as being the last non-zero coefficient, and in doing so accumulates the overall cost with upward and downward adjustments. In this way, RD quantization unit 40 estimates a last non-zero coefficient of a video block without explicitly considering every possible scenario for every possible last non-zero coefficient Once RD quantization unit 40 has estimated the last non-zero coefficient, RD quantization unit 40 may perform a second pass that generates a set of quantized coefficients for the video block based on an assumption that the estimated last non-zero coefficient is actually the last non-zero coefficient of the video block. In particular, in the second pass, RD quantization unit 40 determines final values for each quantized coefficient assuming that coefficient $c_k$ selected in the first pass is actually the last nonzero coefficient in the video block. In this case, for each coefficient $c_i$, $i = k, \ldots, 0$ RD quantization unit 40 finds the value of level $l_i$ for which Lagrangian Cost $J(\lambda, c_i, l_i)$ is minimized. As described previously, three different values of level $l_i$ may be considered, e.g., 0, $l_i^{floor}$ and to $l_i^{ceil}$. In order to calculate context when encoding a value of level $l_i$, the already selected values for levels $l_j$, $j = k, \ldots, i+1$ may be used.

Put another way, generating the set of quantized coefficients may comprise calculating Lagrangian costs associated with each possible non-zero quantized coefficient in the set of quantized coefficients for the video block as having values equal to zero, a floor value and a ceiling value. Again, the floor value may be based on an absolute value of an individual one of the coefficients of the video block, a quantization parameter, and a quantization matrix, and the ceiling value may comprise the floor value plus one.

Figure 10:
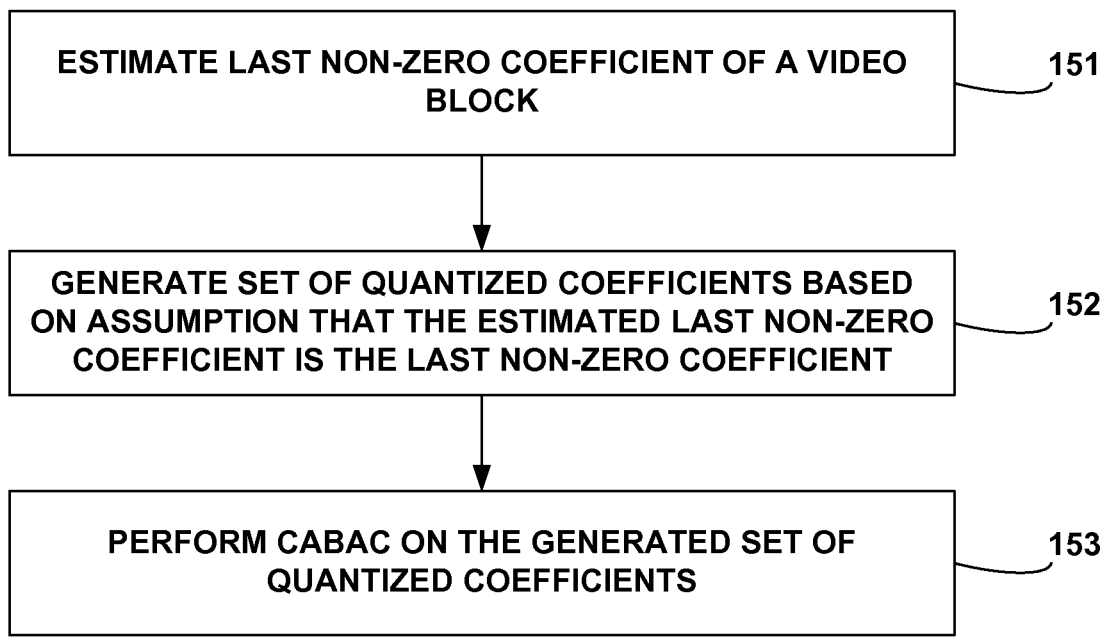
FIG. 10 is a flow diagram illustrating an encoding technique consistent with this disclosure.

FIG. 10 is a flow diagram illustrating an encoding technique that may use the two-pass approach outlined above. In this case, RD quantization unit 40 estimates a last non-zero coefficient of a video block (151). As explained above, this estimation step (151) may include approximating costs associated with coding the video block via the CABAC, and different ones of the approximated costs may correspond to different coefficients being the last non-zero coefficient. In this case, the final estimated last non-zero coefficient defines a lowest approximated cost.

Moreover, during the estimation step (151), RD quantization unit 40 may define the different ones of the approximated costs in a sequential fashion by sequentially considering each of the coefficients of the video block as being the last non-zero coefficient. In doing so, RD quantization unit 40 sequentially adjusts an accumulated cost upward and downward when considering each of the coefficients of the video block as being the last non-zero coefficient.

Next, RD quantization unit 40 generates a set of quantized coefficients based on an assumption that the estimated last non-zero coefficient is, in fact, the last non-zero coefficient (152). The generating step (152) may include calculating Lagrangian costs associated with each possible non-zero quantized coefficient in the set of quantized coefficients for the video block as having values equal to zero, a floor value and a ceiling value. Once generated, RD quantization unit 40 may output the set of quantized coefficients to CABAC unit 46, which performs the CABAC on the generated set of quantized coefficients to entropy code the generated set of quantized coefficients into a bitstream (153). The encoded bitstream can then be output, and possibly modulated and transmitted to another device.

The techniques of this disclosure may be embodied in a wide variety of devices or apparatuses, including a wireless handset, and integrated circuit (IC) or a set of ICs (i.e., a chip set). Any components, modules or units have been described provided to emphasize functional aspects and does not necessarily require realization by different hardware units, etc.

Accordingly, the techniques described herein may be implemented in hardware, software, firmware, or any combination thereof. Any features described as modules or components may be implemented together in an integrated logic device or separately as discrete but interoperable logic devices. If implemented in software, the techniques may be realized at least in part by a computer-readable medium comprising instructions that, when executed, performs one or more of the methods described above. The computer-readable data storage medium may form part of a computer program product, which may include packaging materials. The computer-readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code may be executed by one or more processors, such as one or more digital signal processors (DSPs), general purpose microprocessors, an application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video encoder-decoder (CODEC). Also, the techniques could be fully implemented in one or more circuits or logic elements.

Various aspects of the disclosure have been described. These and other aspects are within the scope of the following claims.

The invention claimed is:

1. A method of quantizing coefficients of a video block for a video coding process that supports context-based adaptive binary arithmetic coding (CABAC), the method comprising:
generating a plurality of sets of quantized coefficients for the video block and a respective Lagrangian cost for each of the plurality of sets of quantized coefficients, wherein:
each set of quantized coefficients from the plurality of sets of quantized coefficients is defined based on a different one of the coefficients of the video block being a last non-zero coefficient of the video block, and
generating the plurality of sets of quantized coefficients comprises:
for each respective set of quantized coefficients from the plurality of sets of quantized coefficients:
the respective set of quantized coefficients is defined based on a particular one of the coefficients of the video block being the last non-zero coefficient of the video block, and
for each respective coefficient in the respective set of quantized coefficients preceding the particular one of the coefficients of the video block:
calculating one or more Lagrangian costs for the respective coefficient, wherein:
each of the one or more Lagrangian costs for the respective coefficient corresponds to a respective quantized value from one or more quantized values of the respective coefficient, and
calculating the one or more Lagrangian costs for the respective coefficient comprises, for each respective Lagrangian cost from the one or more Lagrangian costs for the respective coefficient, using CABAC to calculate a number of bits required to code the quantized value corresponding to the respective Lagrangian cost, the respective Lagrangian cost being based on the number of bits required to code the quantized value corresponding to the respective Lagrangian cost; and
updating the Lagrangian cost for the respective set of quantized coefficients using the Lagrangian cost for a selected quantized value from among the one or more quantized values of the respective coefficient; and
including, in the respective set of quantized coefficients, the selected quantized value; and
selecting a given one of the sets of quantized coefficients associated with a lowest one of the Lagrangian costs for the plurality of sets of quantized coefficients.

2. The method of claim 1, further comprising outputting the given one of the sets of quantized coefficients.

3. The method of claim 1, further comprising:
performing CABAC on the given one of the sets of quantized coefficients to entropy encode the given one of the sets of quantized coefficients into a bitstream; and
outputting the bitstream.

4. The method of claim 1, wherein the one or more quantized values include zero, a floor value, and a ceiling value.

5. The method of claim 4, wherein:
the floor value is based on an absolute value of the respective coefficient, a quantization parameter, and a quantization matrix, and
the ceiling value comprises the floor value plus one.

6. The method of claim 4, wherein calculating the one or more Lagrangian costs for the respective coefficient further comprises:
if the respective coefficient is closer to the floor value than the ceiling value, skipping calculation of a Lagrangian cost corresponding to the ceiling value.

7. The method of claim 1, wherein an additional set of quantized coefficients for the video block is defined based on a given coefficient of the video block being the last non-zero coefficient of the video block, the method further comprising:
if the given coefficient of the video block is closer to a floor value than a ceiling value and if the floor value is equal to zero, skipping generation of a Lagrangian cost for the additional set of quantized coefficients, the floor value and the ceiling value being different quantized values of the given coefficient.

8. The method of claim 1, further comprising:
terminating generating the Lagrangian costs for the sets of quantized coefficients when the Lagrangian cost for a first set of quantized coefficients has increased relative to the Lagrangian cost for a second set of quantized coefficients, wherein:
the first and second sets of quantized coefficients are from the plurality of sets of quantized coefficients,
the first set of quantized coefficients is defined based on a first one of the coefficients of the video block being the last non-zero coefficient of the video block,
the second set of quantized coefficients is defined based on a second one of the coefficients of the video block being the last non-zero coefficient of the video block, and
an index of the first one of the coefficients is less than an index of the second one of the coefficients.

9. The method of claim 1, wherein calculating the one or more Lagrangian costs for the respective coefficient further comprises: for each respective Lagrangian cost from the one or more Lagrangian costs for the respective coefficient:
calculating the respective Lagrangian cost as a sum of a quantization error for the quantized value corresponding the respective Lagrangian cost and a multiplication product of a Lagrangian multiplier and the number of bits required to code the quantized value corresponding to the respective Lagrangian cost.

10. A non-transitory computer-readable medium comprising instructions that upon execution cause a device to quantize coefficients of a video block in a video coding process that supports context-based adaptive binary arithmetic coding (CABAC), wherein the instructions cause the device to:
generate a plurality of sets of quantized coefficients for the video block and a respective Lagrangian cost for each of the plurality of sets of quantized coefficients, wherein:
each set of quantized coefficients from the plurality of sets of quantized coefficients is defined based on a different one of the coefficients of the video block being a last non-zero coefficient of the video block, and
generating the plurality of sets of quantized coefficients comprises:
for each respective set of quantized coefficients from the plurality of sets of quantized coefficients:
the respective set of quantized coefficients is defined based on a particular one of the coefficients of the video block being the last non-zero coefficient of the video block, and
for each respective coefficient in the respective set of quantized coefficients preceding the particular one of the coefficients of the video block:
calculating one or more Lagrangian costs for the respective coefficient, wherein:
each of the one or more Lagrangian costs for the respective coefficient corresponds to a respective quantized value from one or more quantized values of the respective coefficient, and
calculating the one or more Lagrangian costs for the respective coefficient comprises, for each respective Lagrangian cost from the one or more Lagrangian costs for the respective coefficient, using CABAC to calculate a number of bits required to code the quantized value corresponding to the respective Lagrangian cost, the respective Lagrangian cost being based on the number of bits required to code the quantized value corresponding to the respective Lagrangian cost; and
updating the Lagrangian cost for the respective set of quantized coefficients using the Lagrangian cost for a selected one of the one or more quantized values; and
including, in the respective set of quantized coefficients, the selected one of the one or more quantized values; and
select a given one of the sets of quantized coefficients associated with a lowest one of the Lagrangian costs for the plurality of sets of quantized coefficients.

11. The non-transitory computer-readable medium of claim 10, wherein the instructions cause the device to:
output the given one of the sets of quantized coefficients from a quantization unit.

12. The non-transitory computer-readable medium of claim 10, wherein the instructions cause the device to:
perform CABAC on the given one of the sets of quantized coefficients to entropy encode the given one of the sets of quantized coefficients into a bitstream; and
output the bitstream.

13. The non-transitory computer-readable medium of claim 10, wherein the one or more quantized values include zero, a floor value, and a ceiling value.

14. The non-transitory computer-readable medium of claim 13, wherein:
the floor value is based on an absolute value of the respective coefficient, a quantization parameter, and a quantization matrix, and
the ceiling value comprises the floor value plus one.

15. The non-transitory computer-readable medium of claim 13, wherein:
if the respective coefficient is closer to the floor value than the ceiling value, the instructions cause the device to skip calculation of a Lagrangian cost corresponding to the ceiling value.

16. The non-transitory computer-readable medium of claim 10, wherein an additional set of quantized coefficients for the video block is defined based on a given coefficient of the video block being the last non-zero coefficient of the video block, and if the given coefficient of the video block is closer to a floor value than a ceiling value and if the floor value is equal to zero, the instructions cause the device to skip generation of a Lagrangian cost for the additional set of quantized coefficients, the floor value and the ceiling value being different quantized values of the given coefficient.

17. The non-transitory computer-readable medium of claim 10, wherein the instructions cause the device to terminate generating the Lagrangian costs for the sets of quantized coefficients when the Lagrangian cost for a first set of quantized coefficients has increased relative to the Lagrangian cost for a second set of quantized coefficients, wherein:
the first and second sets of quantized coefficients are from the plurality of sets of quantized coefficients,
the first set of quantized coefficients is defined based on a first one of the coefficients of the video block being the last non-zero coefficient of the video block,
the second set of quantized coefficients is defined based on a second one of the coefficients of the video block being the last non-zero coefficient of the video block, and
an index of the first one of the coefficients is less than an index of the second one of the coefficients.

18. An apparatus configured to quantize coefficients of a video block for a video coding process that supports context-based adaptive binary arithmetic coding (CABAC), the apparatus comprising a quantization unit that:
  generates a plurality of sets of quantized coefficients for the video block and a respective Lagrangian cost for each of the plurality of sets of quantized coefficients, wherein:
    each set of quantized coefficients from the plurality of sets of quantized coefficients is defined based on a different one of the coefficients of the video block being a last non-zero coefficient of the video block, and
    for each respective set of quantized coefficients from the plurality of sets of quantized coefficients:
      the respective set of quantized coefficients is defined based on a particular one of the coefficients of the video block being the last non-zero coefficient of the video block, and
      for each respective coefficient in the respective set of quantized coefficients preceding the particular one of the coefficients of the video block, the quantization unit:
        calculates one or more Lagrangian costs for the respective coefficient, wherein:
          each of the one or more Lagrangian costs for the respective coefficient corresponds to a respective quantized value from one or more quantized values of the respective coefficient, and
          for each respective Lagrangian cost from the one or more Lagrangian costs for the respective coefficient, the quantization unit uses CABAC to calculate a number of bits required to code the quantized value corresponding to the respective Lagrangian costs, the respective Lagrangian cost being based on the number of bits required to code the quantized value corresponding to the respective Lagrangian cost; and
        update the Lagrangian cost for the respective set of quantized coefficients using the Langrangian cost for a selected one of the one or more quantized values; and
        include, in the respective set of quantized coefficients, the selected one of the one or more quantized values; and
  selects a given one of the sets of quantized coefficients associated with a lowest one of the Lagrangian costs for the plurality of sets of quantized coefficients.

19. The apparatus of claim 18, wherein the quantization unit:
  outputs the given one of the sets of quantized coefficients.

20. The apparatus of claim 18, further comprising a CABAC unit that:
  performs CABAC on the given one of the sets of quantized coefficients to entropy encode the given one of the sets of quantized coefficients into a bitstream; and
  outputs the bitstream.

21. The apparatus of claim 18, wherein the one or more quantized values include zero, a floor value, and a ceiling value.

22. The apparatus of claim 21, wherein:
  the floor value is based on an absolute value of the respective coefficient, a quantization parameter, and a quantization matrix, and
  the ceiling value comprises the floor value plus one.

23. The apparatus of claim 21 wherein
  if the respective coefficient is closer to the floor value than the ceiling value, the quantization unit skips calculation of a Lagrangian cost corresponding to the ceiling value.

24. The apparatus of claim 21, wherein the apparatus comprises one or more circuits, an integrated circuit (IC) chip or an IC chipset.

25. The apparatus of claim 18, wherein:
  an additional set of quantized coefficients for the video block is defined based on a given coefficient of the video block being the last non-zero coefficient of the video block, and
  if the given coefficient of the video block is closer to a floor value than a ceiling value and if the floor value is equal to zero, the quantization unit skips generation of a Lagrangian cost for the additional set of quantized coefficients, the floor value and the ceiling value being different quantized values of the given coefficient.

26. The apparatus of claim 18, wherein the quantization unit:
  terminates generating the Lagrangian costs for the sets of quantized coefficients when the Lagrangian cost for a first set of quantized coefficients has increased relative to the Lagrangian cost for a second set of quantized coefficients, wherein:
    the first and second sets of quantized coefficients are from the plurality of sets of quantized coefficients,
    the first set of quantized coefficients is defined based on a first one of the coefficients of the video block being the last non-zero coefficient of the video block,
    the second set of quantized coefficients is defined based on a second one of the coefficients of the video block being the last non-zero coefficient of the video block, and
    an index of the first one of the coefficients is less than an index of the second one of the coefficients.

27. A device that quantizes coefficients of a video block for a video coding process that supports context-based adaptive binary arithmetic coding (CABAC), the device comprising:
  means for generating a plurality of sets of quantized coefficients for the video block and a respective Lagrangian cost for each of the plurality of sets of quantized coefficients, wherein:
    each set of quantized coefficients from the plurality of sets of quantized coefficients is defined based on a different one of the coefficients of the video block being a last non-zero coefficient of the video block, and
    generating the sets of quantized coefficients comprises:
      for each respective set of quantized coefficients from the plurality of sets of quantized coefficients:
        the respective set of quantized coefficients is defined based on a particular one of the coefficients of the video block being the last non-zero coefficient of the video block, and
        for each respective coefficient in the respective set of quantized coefficients preceding the particular one of the coefficients of the video block:
          calculating one or more Lagrangian costs for the respective coefficient, wherein:
            each of the one or more Lagrangian costs for the respective coefficient corresponds to a respective quantized value from one or more quantized values of the respective coefficient, and
            calculating the one or more Lagrangian costs for the respective coefficient comprises, for each respective Lagrangian cost from the one or more Lagrangian costs for the respective coefficient, using CABAC to calculate a number of bits required to code the quantized value corresponding to the respective Lagrangian cost, the respective Lagrangian cost being based on the number of bits required to code the quantized value corresponding to the respective Lagrangian cost; and updating the Lagrangian cost for the respective set of quantized coefficients using the Lagrangian cost for a selected one of the one or more quantized values; and including, in the respective set of quantized coefficients, the selected one of the one or more quantized values means for selecting a given one of the sets of quantized coefficients associated with a lowest one of the Lagrangian costs for the plurality of sets of quantized coefficients.

28. The device of claim 27, further comprising:
means for outputting the given one of the sets of quantized coefficients.

29. The device of claim 27, further comprising:
means for performing CABAC on the given one of the sets of quantized coefficients to entropy encode the given one of the sets of quantized coefficients into a bitstream; and
means for outputting the bitstream.

30. The device of claim 27, wherein the one or more quantized values include zero, a floor value, and a ceiling value.

31. The device of claim 30, wherein:
the floor value is based on an absolute value of the respective coefficient, a quantization parameter, and a quantization matrix, and
the ceiling value comprises the floor value plus one.

32. The device of claim 30, wherein calculating the one or more Lagrangian costs for the respective coefficient further comprises:
if the respective coefficient is closer to the floor value than the ceiling value, skipping calculation of a Lagrangian cost corresponding to the ceiling value.

33. The device of claim 27, wherein an additional set of quantized coefficients for the video block is defined based on a given coefficient of the video block being the last non-zero coefficient of the video block, the device further comprising:
means for skipping, if the given coefficient of the video block is closer to a floor value than a ceiling value and if the floor value is equal to zero, generation of a Lagrangian cost for the additional set of quantized coefficients, the floor value and the ceiling value being different quantized values of the given coefficient.

34. The device of claim 27, further comprising:
means for terminating generating the Lagrangian costs for the sets of quantized coefficients when the Lagrangian cost for a first set of quantized coefficients has increased relative to the Lagrangian cost for a second set of quantized coefficients, wherein:
the first and second sets of quantized coefficients are from the plurality of sets of quantized coefficients,
the first set of quantized coefficients is defined based on a first one of the coefficients of the video block being the last non-zero coefficient of the video block,
the second set of quantized coefficients is defined based on a second one of the coefficients of the video block being the last non-zero coefficient of the video block, and
an index of the first one of the coefficients is less than an index of the second one of the coefficients.

* * * * *